United States Patent [19]
Naito et al.

[11] Patent Number: 5,992,951
[45] Date of Patent: Nov. 30, 1999

[54] ANTI-LOCK BRAKE CONTROL SYSTEM FOR MOTOR VEHICLE

[75] Inventors: Yasuo Naito; Chiaki Fujimoto, both of Tokyo, Japan

[73] Assignee: Mitsubishi Denki Kabushiki Kasiha, Tokyo, Japan

[21] Appl. No.: 08/759,677

[22] Filed: Dec. 6, 1996

[30] Foreign Application Priority Data

Jul. 22, 1996 [JP] Japan ................................. 8-192507

[51] Int. Cl.⁶ ....................................................... B60T 8/72
[52] U.S. Cl. ............................................ 303/171; 303/173
[58] Field of Search ..................................... 303/171, 173, 303/172, 170, 167

[56] References Cited

U.S. PATENT DOCUMENTS

| | | | |
|---|---|---|---|
| 4,787,682 | 11/1988 | Muto | 303/173 |
| 4,843,552 | 6/1989 | Inagaki | 364/426.03 |
| 4,980,831 | 12/1990 | Katayama et al. | 303/170 X |
| 5,015,042 | 5/1991 | Yoshino | 303/170 |
| 5,150,952 | 9/1992 | Kuwana et al. | 303/173 |
| 5,185,702 | 2/1993 | Okubo | 303/170 X |
| 5,344,223 | 9/1994 | Sugawara et al. | 303/173 |
| 5,435,634 | 7/1995 | Suto et al. | 303/100 |
| 5,799,261 | 8/1998 | Ozaki et al. | 303/171 X |

FOREIGN PATENT DOCUMENTS

| | | | |
|---|---|---|---|
| 522565 | 1/1993 | European Pat. Off. | 303/171 |
| A-4234819 | 4/1993 | Germany . | |
| A 4314830 | 11/1994 | Germany . | |
| A 4327491 | 2/1995 | Germany . | |
| A 4418070 | 10/1995 | Germany . | |
| 3-79462 | 4/1991 | Japan | 303/171 |
| 6329009 | 11/1994 | Japan . | |

*Primary Examiner*—Chris Schwartz
*Assistant Examiner*—Jeffrey Woller
*Attorney, Agent, or Firm*—Sughrue, Mion, Zinn, Macpeak & Seas, PLLC

[57] ABSTRACT

An anti-lock brake control system capable of performing optimal control of braking hydraulic pressure in a motor vehicle having four wheels while preventing brake application from being released by setting an optimal pseudo vehicle speed by effectively making use of the wheel speeds of four wheels in arithmetic determination of a pseudo vehicle speed on a wheel basis. The anti-lock brake control system includes wheel speed detector (101*a* to 101*d*) for detecting rotation speeds of four wheels, respectively, reference wheel speed arithmetic calculators (102*a* to 102*d*) for setting limits on the wheel speed of the wheels in consideration of positional relations of the wheels relative to one wheel of concern to thereby determine a reference wheel speed, and pseudo vehicle speed arithmetic calculators (103*a* to 103*d*) for arithmetically determining the pseudo vehicle speed on the basis of the reference wheel speed.

6 Claims, 15 Drawing Sheets

ANTI-LOCK BRAKE CONTROL SYSTEM FOR MOTOR VEHICLE

BACKGROUND OF THE INVENTION

1. Field of the Invention

The present invention generally relates to an anti-lock brake control system for controlling braking hydraulic pressure for brake application to a plurality of wheels of a motor vehicle on a wheel-by-wheel basis. More particularly, the invention is concerned with an anti-lock brake control system for arithmetically determining a pseudo vehicle speed on the basis of wheel rotation speeds corrected in consideration of operating states of the individual wheels.

2. Description of Related Art

As a hitherto known system for arithmetically determining a pseudo vehicle speed, there may be mentioned, by way of example, a slip control system for a motor vehicle which is disclosed in Japanese Unexamined Patent Application Publication No. 329009/1994 (JP-A-6-329009) and which includes a wheel speed detecting means for detecting wheel speeds of individual wheels, a pseudo vehicle speed arithmetic means for calculating a pseudo vehicle speed on the basis of the wheel speeds detected by the wheel speed detecting means, and a brake application pressure regulating means for decreasing or lowering the brake application pressure applied to the wheel when the rotation speed thereof falls within a predetermined slip or skid range (indicating locked state of the wheel), to thereby prevent the wheel from being locked and allow the stopping distance to be shortened to a possible minimum.

For having better understanding of the invention, the background art thereof will be reviewed in some detail by referring to FIG. 18 of the accompanying drawings which shows in a flow chart a conventional method of arithmetically determining a pseudo vehicle speed. Referring to the figure, wheel speeds Vfr, Vfl, Vrr and Vrl of a front right wheel, front left wheel, rear right wheel and a rear left wheel, respectively, of a motor vehicle are arithmetically determined by wheel speed detecting devices (not shown) in a step S91 Subsequently, in a step S92, a first pseudo vehicle speed Vr1 is arithmetically determined on the basis of a higher one of the wheel speeds of the front left wheel and the rear left wheel In a succeeding step S93, a second pseudo vehicle speed Vr2 is calculated on the basis of a higher one of the wheel speeds of the front right wheel and the rear right wheel. Additionally, a third pseudo vehicle speed Vr3 is determined on the basis of the highest one of the wheel speeds of all the four wheels in a step S94

Subsequently, the third pseudo vehicle speed Vr3 is corrected by using a value obtained by subtracting a correcting quantity k (k>0) from the third pseudo vehicle speed Vr3 in a step 95, where the correcting value k represents a value which corresponds to a difference in the rotation speed between the wheels located at inner and outer sides, respectively, as viewed in a turning direction when the motor vehicle is turned. In a step S96, the first pseudo vehicle speed Vr1 and the third pseudo vehicle speed Vr3 corrected are compared with each other to thereby determine the higher pseudo vehicle speed as the left-side pseudo vehicle speed Vrfl.

Similarly, the second pseudo vehicle speed Vr2 is compared with the third pseudo vehicle speed Vr3 corrected in the manner mentioned above, to thereby determine the higher pseudo vehicle speed as the right-side pseudo vehicle speed Vrfr. On the basis of the two pseudo vehicle speeds Vrfl and Vrfr as obtained, magnitudes of slips of the two wheels located at the left side of the motor vehicle, as viewed forwardly in the moving direction of the motor vehicle, are arithmetically determined on the basis of the left-side pseudo vehicle speed and the relevant wheel speeds. Similarly, magnitudes of slips of the two wheels located at the right side are calculated on the basis of the right-side pseudo vehicle speed Vrfr and the relevant wheel speeds.

As is apparent from the above description, according to the pseudo vehicle speed calculating method adopted in the conventional slip control apparatus for the motor vehicle known heretofore, the right-side pseudo vehicle speed is so selected or determined as to be at least equal to or higher than the higher one of the wheel speeds of the right-side front and rear wheels. Similarly, the left-side pseudo vehicle speed is so selected as to be higher than or at least equal to the higher one of the wheel speeds of the left-side front and rear wheels.

Under the circumstances, in the case of a motor vehicle in which the driving wheels are operatively coupled to an internal combustion engine by means of a drive shaft so that driving torque is transmitted to each driving wheel from the engine, there may occur such situation that the wheel speed becomes higher than the actual vehicle speed. Furthermore, when the rotation speed of one of the right and left driving wheels operatively coupled to each other by means of a differential mechanism such as a differential gear decreases or sinks steeply, then the rotation speed of the other wheel hops or increases steeply, which may possibly result in the wheel speed increasing beyond the vehicle speed.

For the reasons mentioned above, the pseudo vehicle speed may also increase beyond the actual vehicle speed when the speed of the first wheel increases or rises steeply. Consequently, when the pseudo vehicle speed is arithmetically determined on the basis of the steeply increased wheel speed, the pseudo vehicle speed as calculated increases steeply as well. Additionally, the pseudo vehicle speed determined for the wheel located at the same side or in a same row as the wheel whose speed increase steeply will equally increases. Consequently, when the slip is determined on the basis of the pseudo vehicle speed mentioned above, magnitude of the slip or skid as determined tends to become greater than the actual slip (skid).

Furthermore, when a steering handle of the motor vehicle is rotated over a wide angular range at a high rate while applying the brake upon turning of the motor vehicle, there may arise difference in the rotation speed between the front wheel and the rear wheel which are located at the outer side as viewed in the turning direction of the motor vehicle. Besides, because the pseudo vehicle speed is the same for both the front wheel and the rear wheel when the motor vehicle runs at a speed equal to the pseudo vehicle speed, magnitude of the slip as calculated becomes greater than that of the slip actually taking place.

As will now be appreciated from the above, when the pseudo vehicle speed is higher than the wheel speed of the individual wheels and thus when the magnitude of the slip or skid which is equivalent to the difference between the pseudo vehicle speed as calculated and the wheel speed is greater than that of the slip or skid actually occurring, the braking hydraulic pressure tends to be reduced excessively upon brake operation in an effort to prevent the slip from becoming large, which in turn means that the brake performance of the motor vehicle is degraded, giving rise to a problem that the stopping distance of the motor vehicle increases undesirably

SUMMARY OF THE INVENTION

In the light of the state of the art described above, an object of the present invention is to provide an anti-lock brake control system which can evade the problems described above in conjunction with the conventional brake control apparatus.

Accordingly, it is an object of the present invention to provide an anti-lock brake control system for a motor vehicle which system is capable of arithmetically determining or calculating correctly or optimally a pseudo vehicle speed for each of the individual wheels of a motor vehicle by selecting the wheel speed from right-side front/rear wheels or left-side front/rear wheels and by correcting, if necessary, the pseudo vehicle speed based on the wheel speed in accordance with a positional relation of the wheel of concern to the other wheels so that the arithmetic determination of the pseudo vehicle speed can be protected against any adverse influence even when the speed of the other wheel increases beyond an actual vehicle speed.

In view of the above and other objects which will become apparent as the description proceeds, there is provided according to an aspect of the present invention an anti-lock brake control system for a motor vehicle, which system includes a wheel speed detecting means for detecting wheel speeds of individual wheels, respectively, of a motor vehicle, a reference wheel speed arithmetic means for arithmetically determining corrected wheel speeds by correcting the wheel speeds of other wheels than one wheel selected as a reference wheel with correcting quantities determined in accordance with positional relations between the reference wheel and the other wheels to impose an upper limit and a lower limit for the wheel speed of the reference wheel in accordance with the corrected speeds thereby arithmetically determining a reference wheel speed, and a pseudo vehicle speed arithmetic means for arithmetically determining a pseudo vehicle speed on the basis of the reference wheel speed determined by the reference wheel speed arithmetic means, wherein braking hydraulic pressures for brake application to the wheels are controlled in accordance with results of comparison between the pseudo vehicle speed and the wheel speeds.

By virtue of the above arrangement of the anti-lock brake control system, influence of hopping of one wheel to other wheel(s) can effectively be suppressed. Furthermore, in the course of turning operation of the motor vehicle, correction not only for the left and right wheels running at the inner and outer sides as viewed in the turning direction but also for the front and rear wheels can be taken into account. Thus, the pseudo vehicle speed can be determined optionally even when difference in speed should occur between the front wheel and the rear wheel upon turning of the motor vehicle.

Further provided according to another aspect of the invention is an anti-lock brake control system for a motor vehicle, which system includes a wheel speed detecting means for detecting wheel speeds of individual wheels, respectively, of a motor vehicle, an acceleration/deceleration limit processing means for limiting accelerations and decelerations of the detected wheel speeds, respectively, to thereby determine estimated wheel speeds by estimating vehicle speeds for the wheels, respectively, and a pseudo vehicle speed correcting means for arithmetically determining corrected pseudo vehicle speeds by correcting the estimated wheel speeds of other wheels than one wheel selected as a reference wheel with correcting quantities determined in accordance with positional relations between the reference wheel and the other wheels to thereby arithmetically determine the corrected pseudo vehicle speeds for the other wheels, respectively, and impose an upper limit and a lower limit for the estimated wheel speed of the reference wheel in accordance with the corrected pseudo vehicle speeds thereby arithmetically determining a pseudo vehicle speed. Braking hydraulic pressures for brake application to the wheels are controlled in accordance with results of comparison between the pseudo vehicle speed and the wheel speeds.

Owing to the arrangement of the anti-lock brake control system described above, the acceleration and the deceleration are limited on a wheel-by-wheel basis. Thus, the acceleration/deceleration slopes can be set for the individual wheels, respectively, independent of one another. Besides, the acceleration/deceleration can be modified only for one wheel which suffers, for example, a so-called wheel spin. Besides, because the acceleration/deceleration limits are set for each of the individual wheels, independency of the wheels can be enhanced, whereby limitation of acceleration/deceleration can be validated for each of the wheels independently, while the correction for one of the wheels can be performed on the basis of other wheel or wheels.

In a preferred mode for carrying out the invention, a smallest value of highest wheel speeds of the other wheels, respectively, undergone a lower limit correction may be selected as a lower limit value, and the reference wheel speed may be set higher than the lower limit value inclusive thereof.

Further, a greatest value of highest wheel speeds of the other wheels, respectively, undergone an upper limit correction may be selected as an upper limit value, and the reference wheel speed may be set lower than the upper limit value inclusive thereof.

Owing to the feature of the anti-lock brake control system described above, the pseudo vehicle speed for the reference wheel is inhibited from varying remarkably, i.e., decreasing or increasing excessively, whereby optimal pseudo vehicle speed can easily be determined arithmetically.

In another preferred mode for carrying out the invention, the anti-lock brake control system is applied for a motor vehicle which is of a two-wheel-drive type having two driving wheels and two non-driving wheels. In this control system, when the pseudo vehicle speed for one of the driving wheels is to be arithmetically determined during anti-lock brake control, the wheel speeds of the non-driving wheels may be corrected with correcting quantities determined in accordance with positional relations between the one driving wheel and the two non-driving wheels, respectively, to thereby determine arithmetically corrected speeds, respectively, while the reference wheel speed may be determined by imposing an upper limit and a lower limit to the wheel speed of the one driving wheel with the corrected speeds as determined arithmetically, respectively, and thus the pseudo vehicle speed may be arithmetically determined on the basis of the reference wheel speed.

Owing to the feature of the anti-lock brake control system described above, determination of the pseudo vehicle speed for one driving wheel is not affected by the wheel speed of the other driving wheel. Thus, even when one of the driving wheels hops, the pseudo vehicle speed for the other driving wheel can not be affected thereby.

In a further preferred mode for carrying out the invention, the anti-lock brake control system is applied to the motor vehicle of a two-wheel-drive type having two driving wheels and two non-driving wheels. In this system, when the pseudo vehicle speed for one of the non-driving wheels is to be arithmetically determined during anti-lock brake control, a reference wheel speed may be determined by setting an upper limit and a lower limit for the wheel speed of the one non-driving wheel with corrected speed of the one non-driving wheel as determined on the basis of correcting quantities which are in turn determined in accordance with positional relations of the non-driving wheels, respectively, and a mean value of the wheel speeds of the two driving wheels, to thereby determine arithmetically the pseudo vehicle speed on the basis of the reference wheel speed.

With the arrangement of the anti-lock brake control system described above, even when the wheel speed of one driving wheel decreases steeply with that of the other driving wheel increasing rapidly, the reference wheel speed is smoothed by averaging the speeds of both the driving wheels, whereby the pseudo vehicle speeds for the non-driving wheels is prevented from becoming higher than the actual vehicle speed.

In yet further preferred mode for carrying out the invention, the anti-lock brake control system is applied to a motor vehicle which is of a two-wheel-drive type having two driving wheels and two non-driving wheels. In this system, reference wheel speeds may be determined for the non-driving wheels, respectively, during a period in which anti-lock brake control is not effectuated by setting an upper limit and a lower limit for corrected speeds of the non-driving wheels, respectively, as determined on the basis of correcting quantities which in turn are determined in accordance with positions of the non-driving wheels, respectively, to thereby determine arithmetically the pseudo vehicle speed on the basis of the reference wheel speed.

With the above arrangement of the anti-lock brake control system, the pseudo vehicle speed is prevented from assuming a greater value than the actual vehicle speed even when the hopping of the wheel such as so-called wheel spin should occur during the anti-lock brake control. This is because the pseudo vehicle speed is determined on the basis of the wheel speeds of the non-driving wheels.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
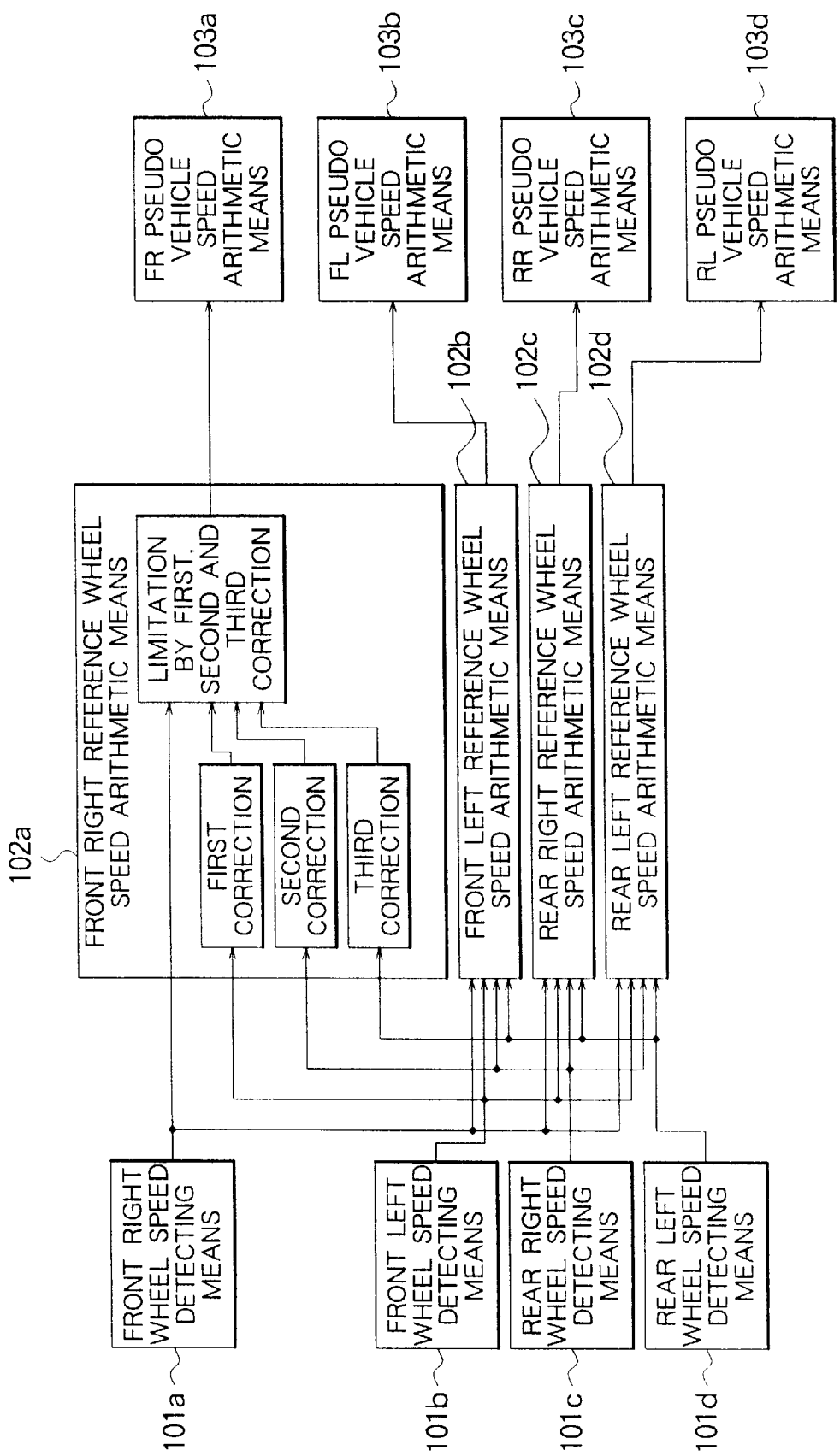
FIG. 1 is a block diagram showing functionally an arrangement for arithmetically determining pseudo vehicle speeds on the basis of wheel speeds, which arrangement is adopted in implementing an anti-lock brake control system according to the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "front", "rear", "upwardly", "downwardly" and the like are words of convenience and are not to be construed as limiting terms.

General Description

Before entering into detailed description, a method or scheme for arithmetically determining pseudo vehicle speeds of a motor vehicle on the basis of wheel speeds and a method for correcting the pseudo vehicle speeds, both of which methods can be adopted in implementing the anti-lock brake control system according to the present invention, will be described briefly by reference to FIGS. 1 and 2.

Figure 5:
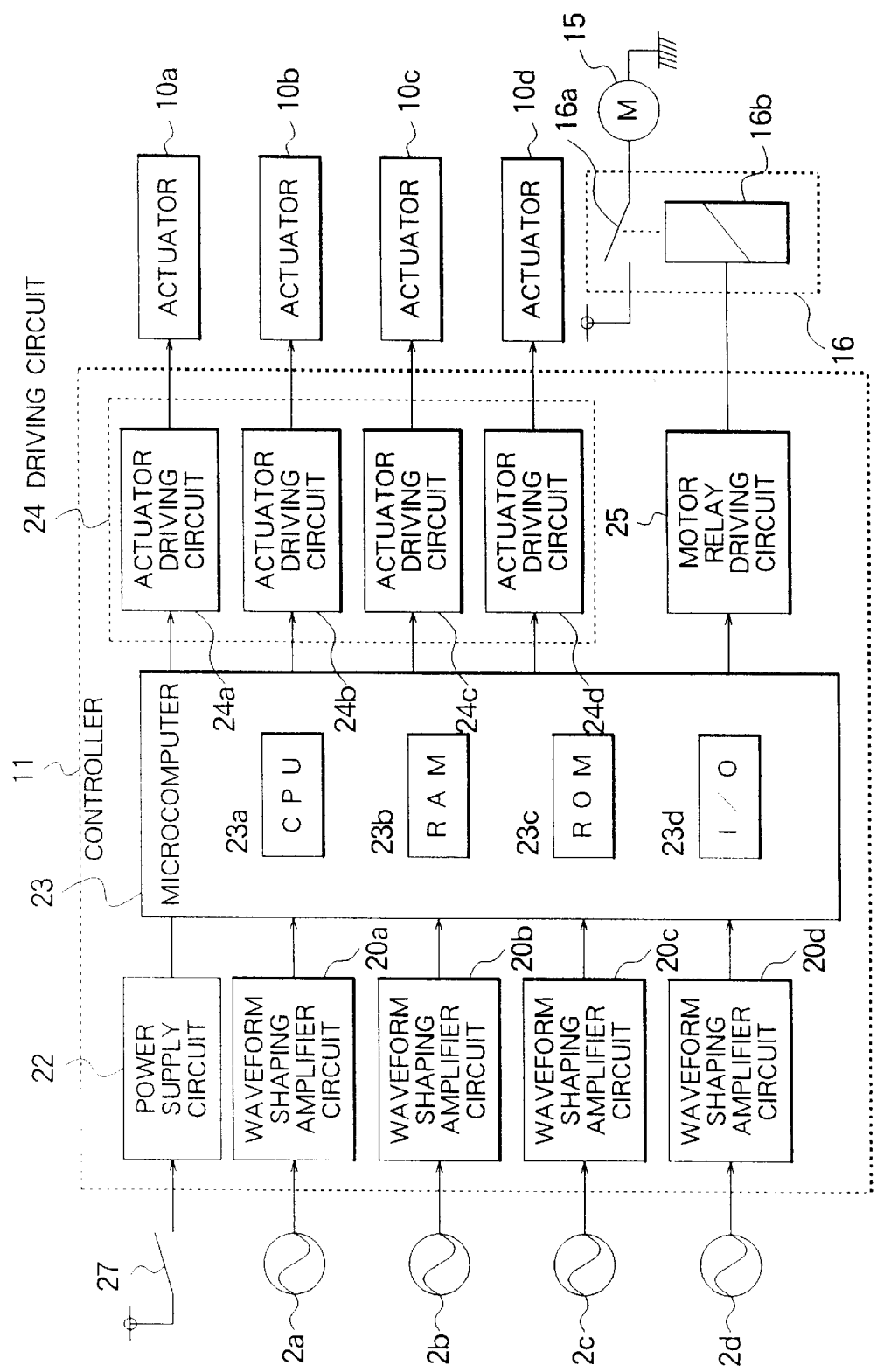
FIG. 5 is a block diagram showing a configuration of a controller shown in FIG. 4.

At first referring to FIG. 1, the anti-lock brake control system for a motor vehicle according to a general aspect of the invention includes wheel speed detecting means 101a, 101b, 101c and 101d for detecting wheel speeds of a front right (FR) wheel, a front left (FL) wheel, a rear right (RR) wheel and a rear left (RL) wheel of the motor vehicle which is assumed as having, for example, four wheels. Each of the wheel speed detecting means may be constituted by a conventional speed sensor device known in the art, as described later on. The outputs of the wheel speed detecting means 101a, 101b, 101c and 101d are supplied to reference wheel speed arithmetic means 102a, 102b, 102c and 102d which are provided in association with the four wheels (FR), (FL), (RR) and (RL), respectively. Each (e.g. 102a) of the reference wheel speed arithmetic means 102a, 102b, 102c and 102d is adapted for arithmetically determining a reference wheel speed by correcting the wheel speed of one wheel (e.g. FR) selected as a reference wheel with correcting quantities ($\alpha, \beta, \gamma$) determined in accordance with positional relations between the reference wheel (e.g. FR) and the other wheels (FL, RR, RL) to thereby impose an upper limit and a lower limit for the wheel speed of the reference wheel (e.g. FR). The reference wheel speed arithmetic means may be implemented softwarewise and/or hardwarewise by using a microcomputer and peripheral or interface units therefor which constitute a major part of a controller described hereinafter (see FIG. 5). The reference wheel speed as determined by the front right reference wheel speed arithmetic means 102a is then supplied to a pseudo vehicle speed arithmetic means 103a which is designed for arithmetically determining a pseudo vehicle speed on the basis of the reference wheel speed as supplied. The braking hydraulic pressure for brake application to the wheel (FR) is controlled in accordance with results of comparison between the pseudo vehicle speed and the wheel speed as detected by the front right (FR) wheel speed detecting means 101a. The pseudo vehicle speed arithmetic means 103a may functionally be implemented by the microcomputer (FIG. 5). Further, the comparison between the pseudo vehicle speed and the wheel speed can be realized internally by the microcomputer (23, FIG. 5) as well. At this juncture, it should be mentioned that the reference wheel speed arithmetic means 102a, 102b, 102c and 102d as well as the pseudo vehicle speed arithmetic means 103a, 103b, 103c and 103d are provided in association with the wheel speed detecting means 101a, 101b, 101c and 101d and hence in association with the four wheels (FR), (FL), (RR) and (RL), respectively, as can readily be seen in FIG. 1. Thus, the pseudo vehicle speed can be determined for each of the wheels in a similar manner as described above in conjunction with the front right reference wheel speed arithmetic means 102a and the FR pseudo vehicle speed arithmetic means 103a. In this manner, the braking hydraulic pressures for brake application to the individual wheels, respectively, can be controlled independent of each other, whereby the brakes for the individual wheels can be controlled optimally on a wheel-by-wheel basis.

Figure 2:
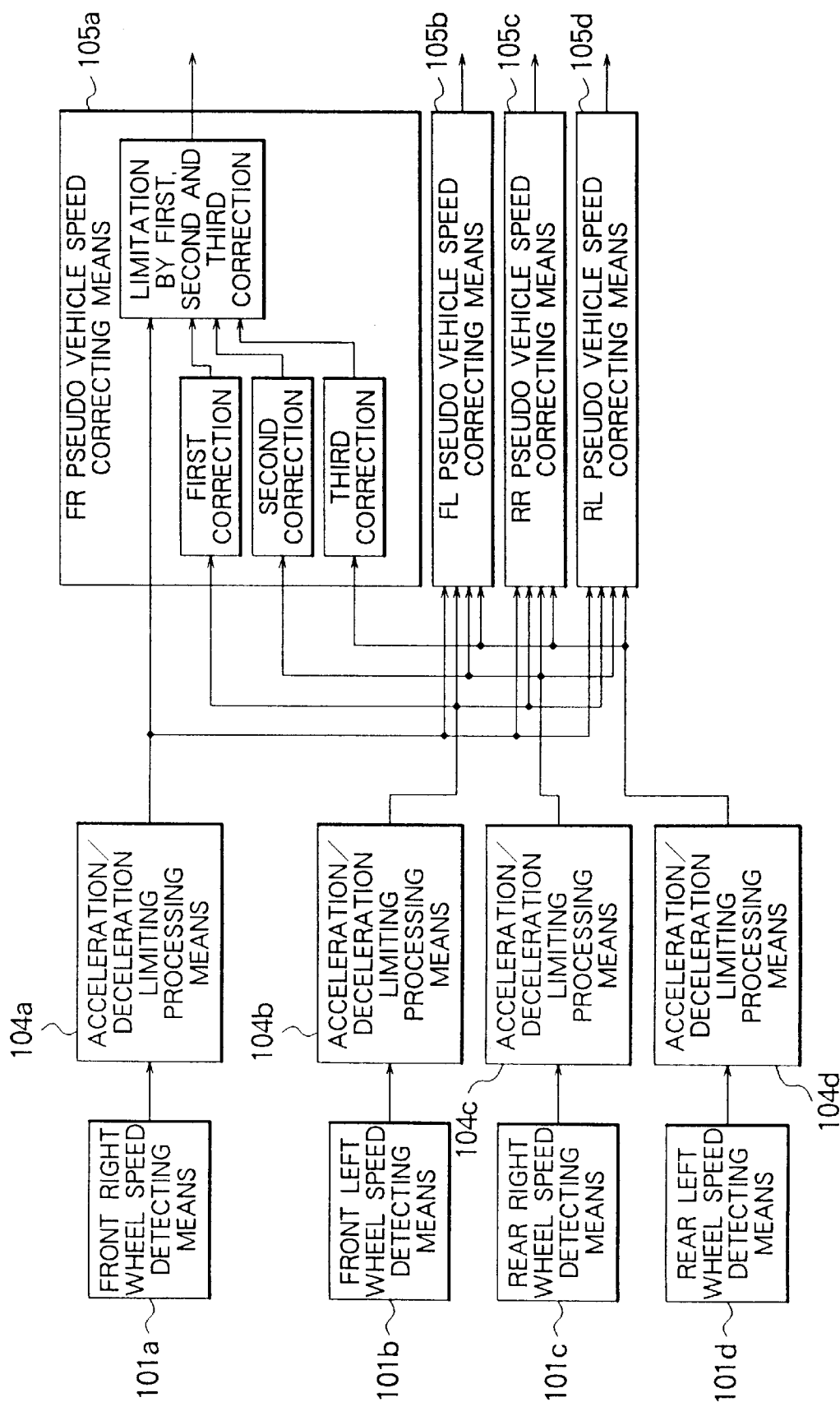
FIG. 2 is a functional block diagram showing an arrangement for correcting the pseudo vehicle speeds based on the wheel speeds, respectively, which arrangement is adopted in implementing an anti-lock brake control system according to the present invention.

Next referring to FIG. 2, the anti-lock brake control system according to another aspect of the present invention further includes acceleration/deceleration limiting processing means 104a, 104b, 104c and 104d provided in association with the four wheels FR, FL, RR and RL, respectively, for limiting transients of the wheel speed such as rapid or steep variation of the wheel speeds as detected. Except for this difference, the general arrangement of the anti-lock brake control system shown in FIG. 2 is essentially same as that shown in FIG. 1. It should however be mentioned that with the arrangement of the anti-lock brake control system shown in FIG. 2, the anti-lock brake control can be realized for the individual wheels in a very stable manner without being affected by transient events or phenomena occurring in the other wheel(s) such as hopping or spinning, sinking or the like.

Embodiment 1

Figure 3:
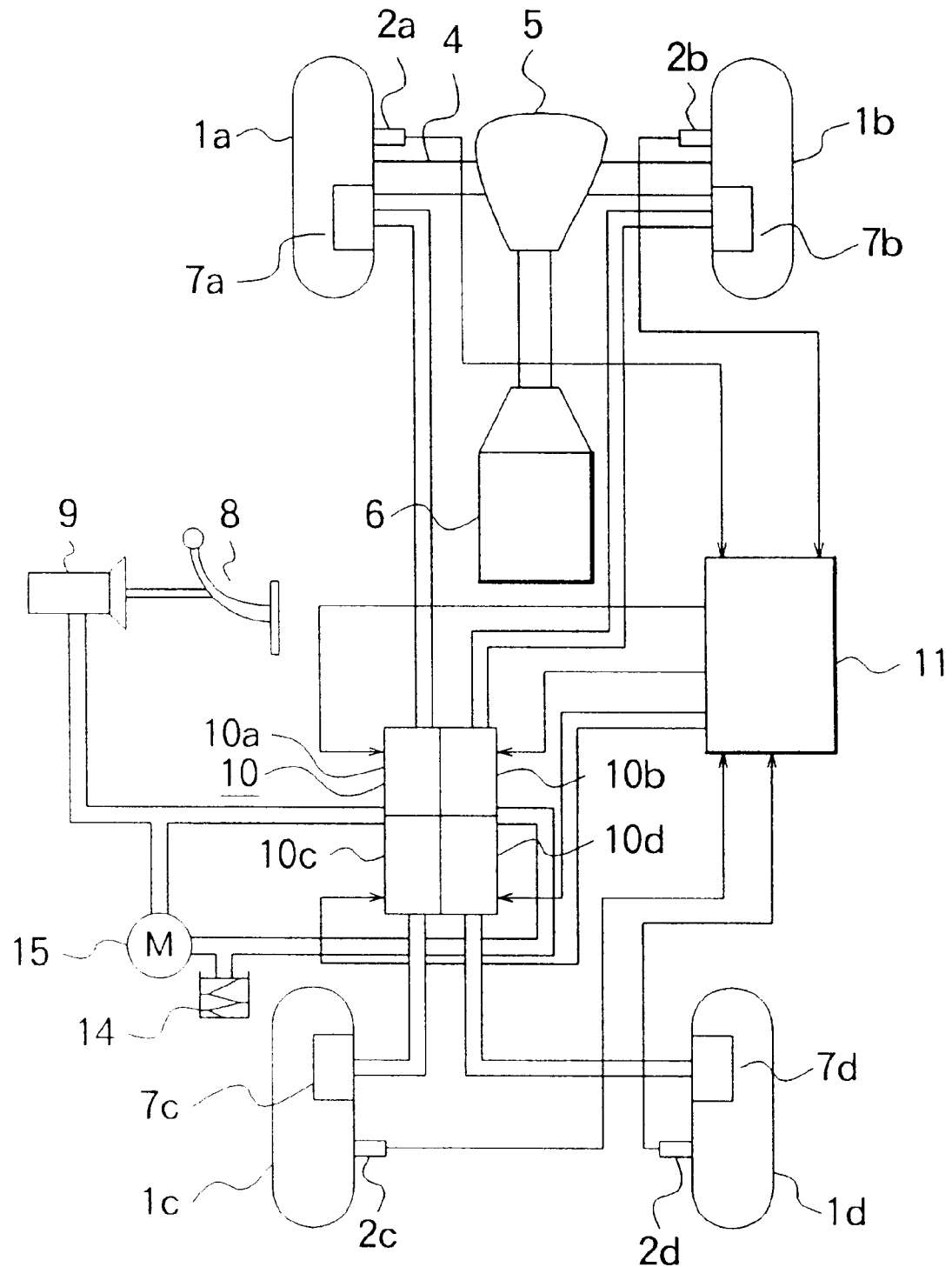
FIG. 3 is a view showing a schematically a general arrangement of the anti-lock brake control system mounted on a motor vehicle according to the present invention.
Figure 4:
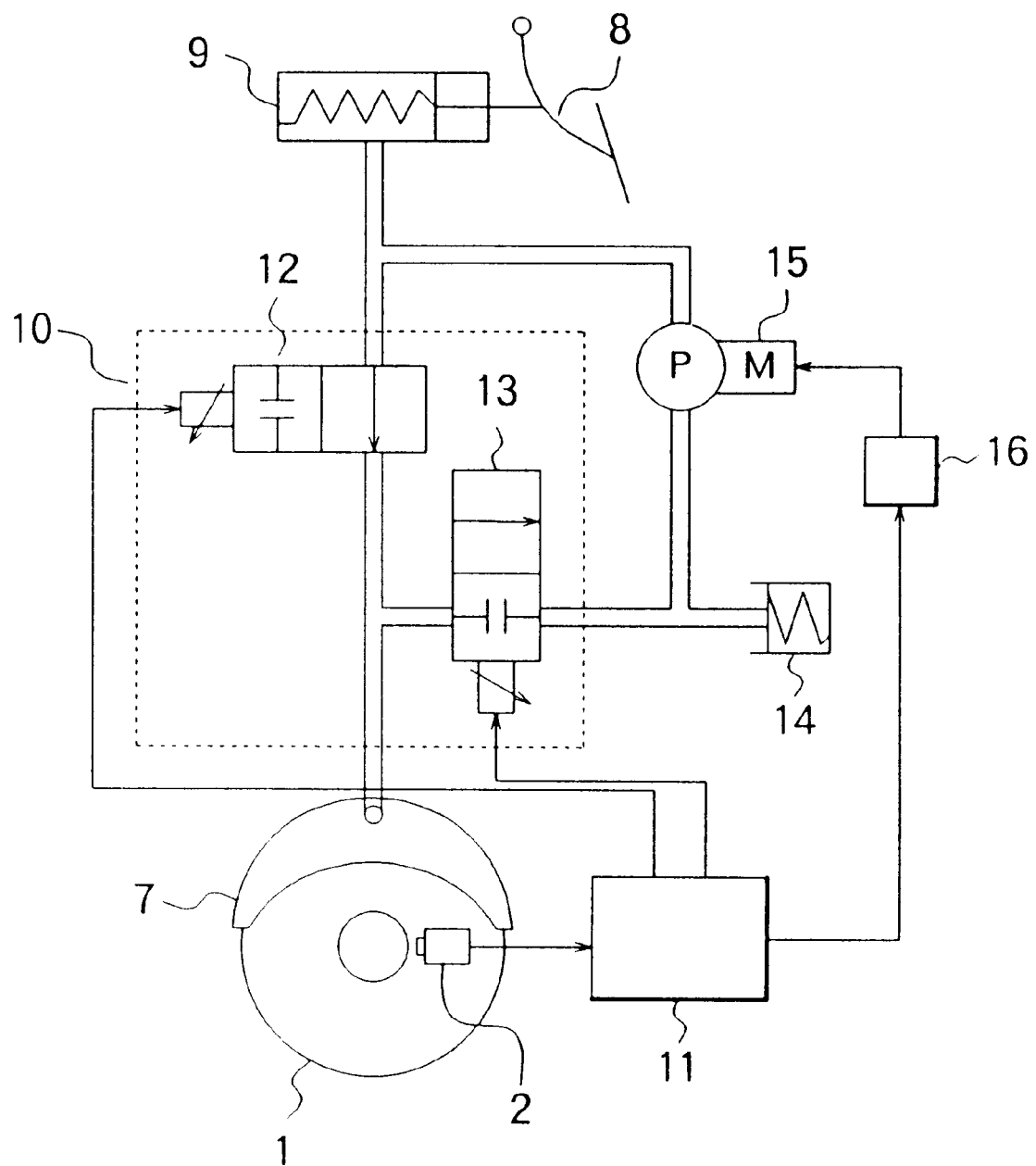
FIG. 4 is a diagram showing in detail a structure of an actuator employed as a brake fluid pressure regulating means in the anti-lock brake control system shown in FIG. 3.

An anti-lock brake control system according to a first embodiment of the present invention will now be described by referring to FIGS. 3 to 5 first, in which FIG. 3 is a view showing schematically a general arrangement of the anti-lock brake control system mounted on a motor vehicle, FIG. 4 is a diagram showing in detail a structure of an actuator shown in FIG. 3, and FIG. 5 is a block diagram showing a configuration of a controller shown in FIG. 4.

Referring to FIG. 3, the wheel speeds of individual wheels of a motor vehicle are detected by wheel speed sensors 2a to 2d (designated generally by reference numeral 2) which may be constituted by an electronic pick-up type sensor or photoelectric transducer type sensor. More specifically, the wheel speed sensor 2a is mounted on the motor vehicle at a position near to a vehicle wheel 1a to generate a rotation speed signal indicating the rotation speed of the vehicle wheel 1a. Similarly, the wheel speed sensors 2b to 2d are mounted at positions in the vicinity of the driving wheel 1b and non-driving wheels 1c and 1d, respectively, to thereby generate rotation speed signals indicative of the rotation speeds of these wheels, respectively. Parenthetically, these wheel speed sensors 2a to 2d functionally correspond to the wheel speed detecting means 101a to 101d (designated representatively by 101), respectively.

As can be seen in FIG. 3, the driving wheels 1a and 1b are operatively coupled to an internal combustion engine (hereinafter simply referred to as the engine) 6 of the motor vehicle by way of a drive shaft 4 and a differential mechanism 5. However, neither the non-driving wheel 1c nor a non-driving wheel 1d are coupled to the engine 6. Of the braking devices 7a to 7d, the braking device 7a serving for brake application is provided in association with the driving wheel 1a. Similarly, the braking devices 7b to 7d are provided in association with the driving wheel 1b and non-driving wheel 1c and 1d, respectively.

When a brake pedal 8 is depressed, a brake application pressure is generated by means of a master cylinder 9. The brake application pressure generated from the master cylinder 9 is transmitted to the braking devices 7a to 7d through actuators 10, respectively, which are adapted to be controlled by controllers 11, respectively, which will be described later on. Of the actuators 10a to 10d shown in FIG. 4, the actuator 10a is provided in association with the braking device 7a for the wheel 1a. Similarly, the actuators 10b to 10d are provided in correspondence to the braking devices 7b to 7d for the wheels 1b to 1d, respectively.

The controller 11 is designed to receive signals from the wheel speed sensor 2 and the torque sensor (not shown) for performing arithmetic operations and control processings for the anti-lock brake control on the basis of the signals mentioned above to thereby generate driving signals to the actuators 10a to 10d, respectively. Incidentally, the controller 11 serves for realizing the functions of the front right (FR) reference wheel speed arithmetic means 102a, front left (FL) reference wheel speed arithmetic means 102b, rear right (RR) reference wheel speed arithmetic means 102c and the rear left (RL) reference wheel speed arithmetic means 102d as well as those of the pseudo vehicle speed arithmetic means 103a to 103d described previously by reference to FIG. 1.

As can be seen in FIG. 4, the actuator 10 shown representatively includes a pressure-holding solenoid valve 12 installed in a hydraulic pipe extending from a master cylinder 9 to the braking device 7 and a pressure-reducing solenoid valve 13 installed on a hydraulic fluid recovering pipe which extends from a hydraulic pipe extending from the braking device 7 to the reservoir tank 14 through the hydraulic fluid recovery pump 15 to the master cylinder 9. Operations of the pressure-holding solenoid valve 12 and the pressure-reducing solenoid valve 13 are controlled by the controller 11 by electronically energizing or deenergizing the solenoids thereof. On the other hand, a motor relay 16 serves connection/disconnection of the power supply to/from the motor of the hydraulic fluid recovery pump 15 in dependence on the output of the controller 11.

With the structure of the actuator 10 described above, a hydraulic pressure is supplied to the master cylinder 9 upon depression of the brake pedal 8, as a result of which a brake fluid or oil flows from the master cylinder 9 into the braking device 7 by way of the pressure-holding solenoid valve 12 of the actuator 10, whereby the brake application pressure is increased.

On the other hand, when a pressure-reducing signal is outputted from the controller 11, the pressure-holding solenoid valve 12 and the pressure-reducing solenoid valve 13 are electrically energized, which results in that the brake fluid passage extending between the master cylinder 9 and the braking device 7 is closed or interrupted, while a brake fluid passage between the braking device 7 and the reservoir tank 14 is opened.

Consequently, the braking hydraulic pressure within the braking device 7 is released to the reservoir tank 14 to thereby reduce or decrease the brake application pressure At the same time, the motor relay 16 is so actuated as to connect a pump motor (not shown) of the hydraulic fluid recovery pump 15 to the power supply source, as a result of which the hydraulic pressure within the reservoir tank 14 is increased, whereby the hydraulic fluid is fed back to the master cylinder 9 for preparation for a succeeding control.

Thereafter, a hold signal is issued from the controller 11 for holding only the pressure-holding solenoid valve 12 in the electrically energized state, whereby all the braking hydraulic pressure paths are interrupted with the brake application pressure being held.

Further, when a pressure-increasing signal is issued from the controller 11, the electric currents supplied to the pressure-holding solenoid valve 12 and the pressure-reducing solenoid valve 13 are interrupted, which results in that the hydraulic path between the master cylinder 9 and the braking device 7 is again established. As a consequence, the high-pressure brake fluid fed back to the master cylinder 9 as well as the brake fluid discharged from the hydraulic fluid recovery pump 15 is caused to flow into the braking device 7, whereby the brake application pressure is increased.

As will now be apparent from the above description, the actuator 10 adjusts the brake application pressure by repeating the pressure reducing operation, pressure holding operation and the pressure increasing operation in accordance with the commands issued from the controller 11 to thereby realize the anti-lock brake control.

The controller 11 is implemented in such a configuration as shown in FIG. 5. As can be seen in the figure, the controller 11 includes waveform shaping amplifier circuits 20a, 20b, 20c and 20d (designated representatively by reference numeral 20) which serve for shaping the pulse signals outputted from the wheel speed sensors 2a, 2b, 2c and 2d (designated representatively by numeral 2), respectively. More specifically, the waveform shaping amplifier circuit 20 shapes the pulse signal outputted by the wheel speed sensor 2 into a pulse signal which is suited for the processings executed by the microcomputer 23. Needless to say, the outputs of the waveform shaping amplifier circuits 20a, 20b, 20c and 20d are supplied to the microcomputer 23.

The controller 11 includes a power supply circuit 22 which serves for supplying a predetermined constant voltage to the microcomputer 23 and others in response to closing (turn-on) of an ignition switch 27 of the motor vehicle. The microcomputer 23 includes a CPU (Central Processing Unit) 23a, a RAM (Random Access Memory) 23b, a ROM (Read-Only Memory) 23c, an input/output unit 23d and others Further, the controller 11 includes actuator driving circuits 24a, 24b, 24c and 24d (designated representatively by numeral 24) which output driving signals for driving the actuators 10a, 10b, 10c and 10d (designated representatively by numeral 10), respectively, in response to the control signals outputted from the microcomputer 23.

More specifically, the actuator driving circuit 24a electrically drives the electromagnetic solenoid of the actuators 10a, 10b, 10c and 10d, respectively. In addition, the controller 11 includes a driving circuit 25 which serves for electrically energizing a coil 16b of the motor relay 16 to hold a normally opened contact 16a of the motor relay 16 in the on-state (closed state).

Figure 6:
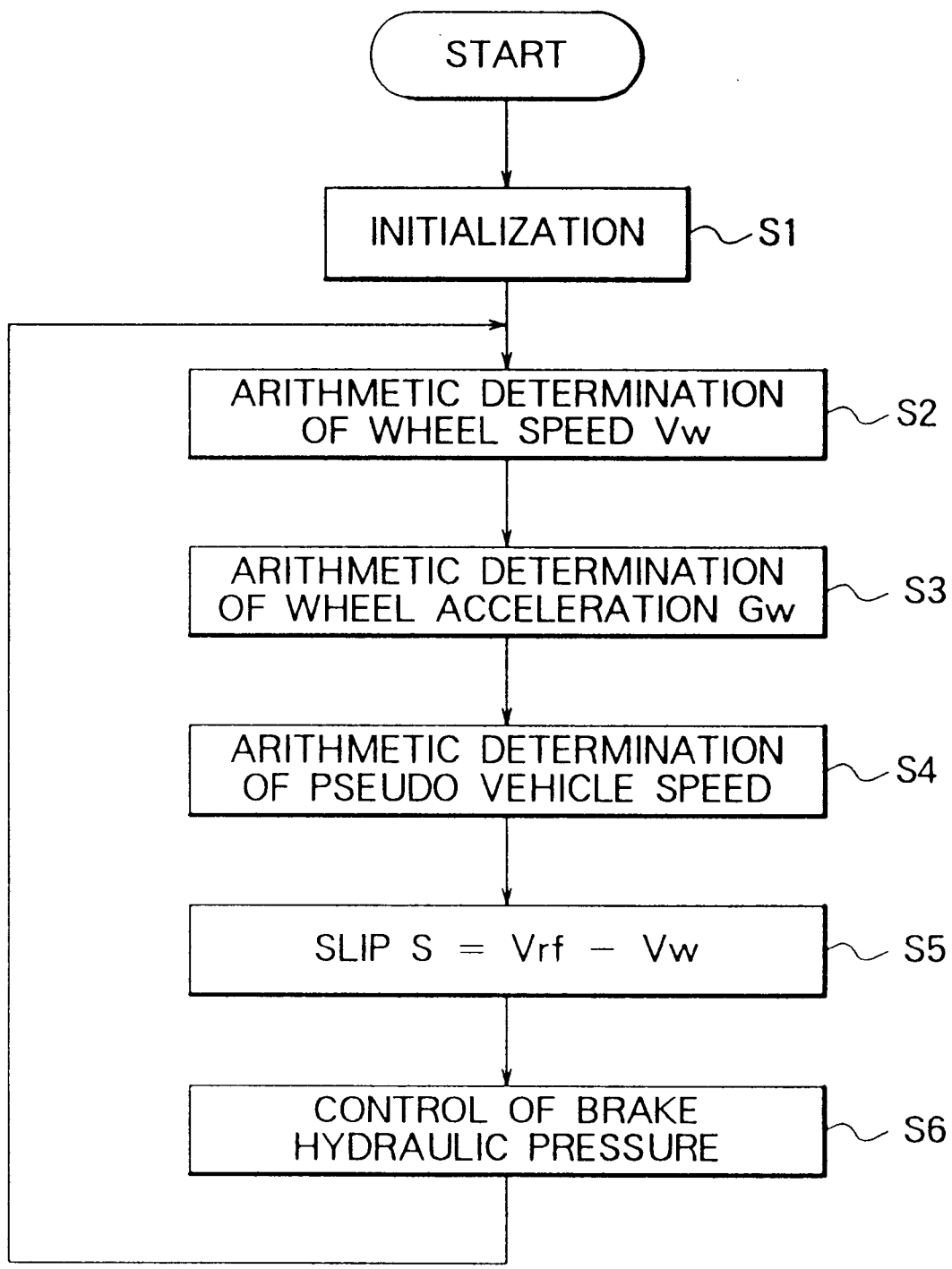
FIG. 6 is a flow chart for illustrating a flow of processings according to a first embodiment of the invention.
Figure 7:
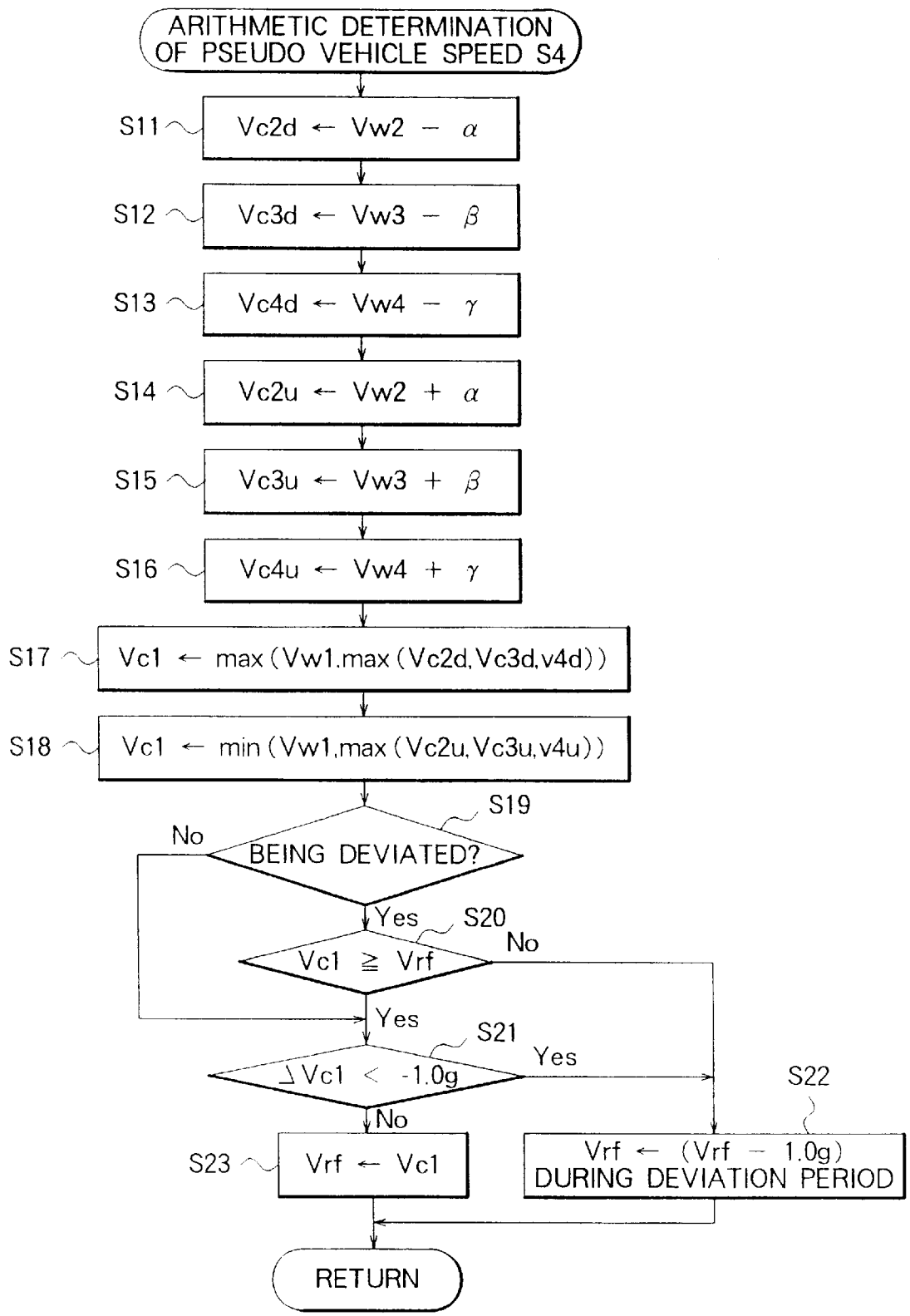
FIG. 7 is a flow chart for illustrating a flow of processings for arithmetically determining a pseudo vehicle speed according to the first embodiment of the invention.
Figure 10:
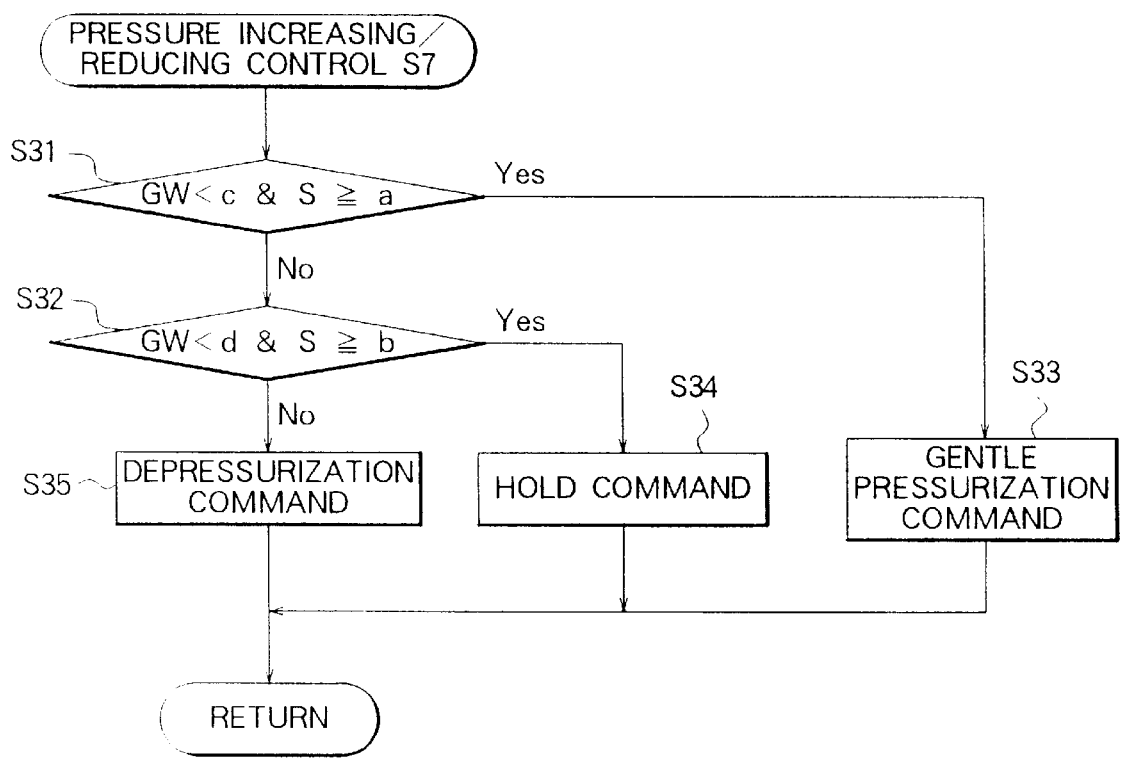
FIG. 10 is a flow chart for illustrating in general a braking hydraulic pressure control according to the first embodiment of the invention.

Next, referring to flow charts shown in FIGS. 6, 7 and 10, description will be directed to the processing operations of the microcomputer 23 incorporated in the controller 11 implemented in the structure described above.

At first, general processing flow will be explained by reference to FIG. 6. In a step S1, initialization of the RAM 23b and the input/output unit 23d is performed. Subsequently, the wheel speed Vw is arithmetically determined in a step S2. More specifically, upon reception of the pulse signal having a pulse frequency indicative of the rotation speed of the relevant wheel, the microcomputer 23 starts the wheel speed arithmetic processing (step S2) and at the same time starts the counting of the pulse number Pn of the wheel speed signal for the purpose of measuring the time lapse Tn from the start of the pulse counting operation. On the basis of the value of the count value Pn and the time lapse Tn thus obtained, the wheel speed Vw is calculated in accordance with the following expression (1):

$$Vw = Kv(Pn/Tn) \qquad (1)$$

where Kv represents a coefficient or constant which can be determined in consideration of the diameter of the wheel, characteristics of the wheel speed sensor 2 and other factors. At this juncture, it is important to note that the wheel speed Vw is determined for the four wheels, respectively.

In a succeeding step S3, wheel acceleration Gw is arithmetically determined on the basis of each wheel speed Vw. To this end, a difference between the wheel speed Vw determined in the step S2 in the currently executed control routine and the wheel speed Vw determined in the corresponding step S2 in the immediately preceding control routine is determined, whereon the wheel acceleration Gw is arithmetically determined on the basis of the difference mentioned above and a time interval TL at which the control or processing routine now under consideration is executed periodically in accordance with the following expression (2):

$$Gw = Kg((Vw - Vw1)/TL) \qquad (2)$$

where Kg represents a constant. The wheel acceleration Gw indicates that the wheel is being accelerated when the wheel acceleration Gw is of a plus sign (i.e., when Gw<0 (zero)), while the wheel acceleration Gw of minus sign (i.e., Gw<0) indicates that the wheel is being decelerated Similarly to the wheel speed Vw, the wheel acceleration Gw is determined for each of the four wheels.

In a step S4, a reference wheel speed Vc1 is selected from the wheel speeds Vw of the four wheels, whereon limitation is imposed on acceleration and deceleration of the reference wheel speed Vc1 to thereby set up a slope for the pseudo vehicle speed for enabling the arithmetical determination of the pseudo vehicle speed Vrf. Of course, the pseudo vehicle speed Vrf is determined for all of the wheels.

By way of example, let's assume that the pseudo vehicle speed Vrf is determined with the front right wheel being selected as the reference wheel. In that case, the wheel speed Vwfr of the front right wheel is set as the reference wheel speed Vw1, while the wheel speed Vwfl of the front left wheel is set as the wheel speed Vw2 with the wheel speed Vwrr of the rear right wheel and the wheel speed Vwrl of the rear left wheel being set as the wheel speed Vw3 and the wheel speed Vw4, respectively, whereupon the arithmetic processing for determining the pseudo vehicle speed Vrf is executed.

On the other hand, in case the pseudo vehicle speed Vrf is to be determined with the front left wheel being selected as the reference wheel, the wheel speed Vwfl of the front left wheel is set as the reference wheel speed Vw1, while the wheel speed Vwfr of the front right wheel at the right side is set as the wheel speed Vw2 with the wheel speed Vwrl of the rear left wheel and the wheel speed Vwrr of the rear right wheel being set as the wheel speed Vw3 and the wheel speed Vw4, respectively. In this manner, the arithmetic processing for determining the pseudo vehicle speed Vrf is performed after having placed the individual wheel speeds in the variable Vw in conformance with the positional relation existing among the individual wheels of the motor vehicle.

In a step S5, the wheel speed Vw (which represents generally the wheel speeds of the individual wheels) is subtracted from the pseudo vehicle speed Vrf to thereby calculate the magnitude of the slip S at each of the wheels.

In a step S6, the braking hydraulic pressure is controlled by driving the actuator 10 on the basis of the slip S and the wheel acceleration Gw. More specifically, the braking hydraulic pressure is reduced or held or increased by correspondingly driving the actuator 10 for each of the wheels. To say in another way, the actuator 10 can be operated only in three modes, i.e., pressure reducing mode, pressure holding mode and the pressure increasing mode. Accordingly, when the braking hydraulic pressure is to be increased gently by suppressing the gain for pressurization, the pressure holding signal pulses are periodically dispersed in the pressure increasing signal pulses so that the braking hydraulic pressure increases only gently or slowly. On the other hand, when the braking hydraulic pressure is to be reduced gently by suppressing the gain for depressurization, the pressure holding signal pulses are periodically inserted in the pressure decreasing signal.

Having executed the processings described above, the routine resumes the step S2 after lapse of a predetermined time interval. The processings in the steps S2 to S6 are repetitively executed until the ignition switch 27 is turned off after completion of the braking operation.

The arithmetic processing or operation for determining the pseudo vehicle speed in the step S4 mentioned previously will now be described in detail by reference to the flow chart shown in FIG. 7 on the assumption that the pseudo vehicle speed Vrf is determined by executing repeatedly a number of times the processing in the step S4.

A given one of the wheels is set as the reference wheel and the wheel speed thereof is represented by Vw1. Further, the wheel speed of the wheel located at the left or right side in opposition to the reference wheel is represented by Vw2. On the other hand, the wheel speed of the wheel positioned at the front or rear side of the reference wheel is represented by Vw3 while the wheel speed of the wheel located diametrically opposite to the reference wheel is represented by Vw4. On the basis of these wheel speeds, the reference wheel speed Vc1 of the reference wheel is determined.

Figure 8:
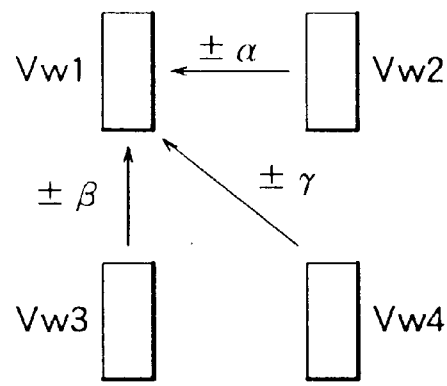
FIG. 8 is a view for illustrating a positional relationship among wheels which is taken into consideration in the correcting processings.

In this conjunction, the reference wheel speed Vw1 of the driving wheel 1a of concern which is to serve as the reference wheel speed Vc1 is imposed with limitations by taking into account correcting quantities $\alpha$, $\beta$ and $\gamma$ which are determined previously in consideration of the positional relations of the other three wheels 1b to 1d to the driving wheel 1a of concern, as can be seen in FIG. 8.

More specifically, in a step S11, a lower-limit wheel speed correcting quantity Vc2d for the wheel located at the left or right side of the reference wheel is determined by subtracting the correcting quantity $\alpha$ from the wheel speed Vw2.

In a step S12, the lower-limit wheel speed correcting quantity Vc3d for the wheel located at the front or rear side of the reference wheel is determined by subtracting the correcting quantity $\beta$ from the wheel speed Vw3.

In a step S13, the lower-limit wheel speed correcting quantity Vc4d for the wheel located diametrically opposite to the reference wheel is determined by subtracting the correcting quantity $\gamma$ from the wheel speed Vw4.

In a step S14, an upper-limit wheel speed correcting quantity Vc2u for the wheel located at the left or right side of the reference wheel is determined by adding the correcting quantity $\alpha$ to the wheel speed Vw2.

In a step S15, the upper-limit wheel speed correcting quantity Vc3u for the wheel located at the front or rear side of the reference wheel is determined by adding the correcting quantity $\beta$ to the wheel speed Vw3.

In a step S16, the upper-limit wheel speed correcting quantity Vc4u for the wheel located diametrically opposite to the reference wheel is determined by adding the correcting quantity $\gamma$ to the wheel speed Vw4. In this conjunction, it is to be mentioned that when the reference wheel is one of the front wheels, the correcting quantities $\alpha$, $\beta$ and $\gamma$ are given by ratios or percentages of the wheel speeds to be corrected, as represented by the following expression (3):

$$\alpha = 0.15 \times Vw2$$

$$\beta = 0.1 \times Vw3$$

$$\gamma = 0.15 \times Vw4 \tag{3}$$

On the other hand, when the reference wheel is one of the rear wheels, the following expression (4) applies valid.

$$\alpha = 0.1 \times Vw2$$

$$\beta = 0$$

$$\gamma = 0.1 \times Vw4 \tag{4}$$

As can be seen from the above, when the rear wheel is selected as the reference wheel, the correcting quantities based on the positional relation of the wheels are small as compared with the case where the front wheel is selected as the reference wheel, the reason for which can be explained by the fact that by setting the rear wheel speed more or less higher than those of the front wheels, stability can be ensured for the rear wheels in the anti-lock brake control because the braking force applied to the rear wheels is mitigated when compared with the braking force applied to the front wheels.

As an alternative, the correcting quantities α, β and γ may be determined as functions of the wheel speed with the characteristics of the motor vehicle in the turning maneuver being taken into consideration. Further, instead of selecting the correcting quantities α, β and γ to be same for both the upper limit and the lower limit, they may be different from the upper and lower limits, respectively. Besides, the correcting quantities may be determined for each of the wheels so as to conform with maneuverability characteristics of the motor vehicle such as the turning performance.

In a step S17, processing for setting a lower limit for the reference wheel speed Vc1 is executed. More specifically, the smallest value of the maximum speeds of the three wheels other than the reference wheel which have been corrected with the respective lower limit correcting quantities is determined as the lower limit value for the reference wheel speed Vc1 so that the reference wheel speed Vc1 can not assume the value smaller than the lower limit value. By providing the lower limit value in this manner, the reference wheel speed Vc1 is prevented from becoming lower than the vehicle speed. It should further be added that the lower limit value of the reference wheel speed Vc1 is set up by taking into consideration the correction of the individual wheels in the turning operation of the motor vehicle.

Accordingly, when the reference wheel is located at the inner side as viewed in the turning direction (i.e., located inside of the arcuate path followed by the motor vehicle upon turning), the reference wheel can be decreased to the corrected speed of the wheel located outside of the arcuate path mentioned above. On the other hand, when one of the wheels located at the outer side as viewed in the turning direction is selected as the reference wheel, then the pseudo vehicle speed Vrf can be decreased in conformance with the rotation speed of the wheel serving as the reference wheel because occurrence of difference between the front wheel and the rear wheel can be coped with. In this way, the pseudo vehicle speed Vrf is inhibited from becoming greater than the actual vehicle speed.

In a step S18, processing for setting an upper limit for the reference wheel speed is performed. More specifically, a maximum value of the highest speeds of the three other wheels which have been corrected by the respective correcting quantities is selected as the upper limit for the reference wheel speed so that the reference wheel speed can not exceed the upper limit highest speed as set. By setting the upper limit for the reference wheel speed in this manner, the speed of the reference wheel can be prevented from increasing steeply beyond the actual vehicle speed even when the reference wheel is a driving wheel and when the speed of the driving wheel located at the opposite side relative to the reference wheel and coupled to the latter by way of a differential mechanism.

As is apparent from the above description, by imposing limitation to the reference wheel speed with the upper limit value and the lower limit value derived from the speeds of the three other wheels corrected in consideration of the positional relationship among them and relative to the reference wheel, the reference wheel speed can assume an appropriate or proper value, being prevented from lowering or rising excessively.

In a step S19, decision is made as to whether or not the pseudo vehicle speed Vrf is deviated from the reference wheel speed Vc1. If so, then the processing proceeds to a step S20, and if otherwise, the processing proceeds to a step S21.

In the step S20, the pseudo vehicle speed Vrf is compared with the reference wheel speed Vc1. Unless the pseudo vehicle speed Vrf is higher than the reference wheel speed Vc1, it is then decided that the state in which the pseudo vehicle speed Vrf is deviated from the reference wheel speed Vc1 has disappearance, whereupon the processing proceeds to the step S21. If otherwise, it is decided that the pseudo vehicle speed Vrf is being deviated from the reference wheel speed Vc1, whereupon the processing proceeds to a step S22.

Figure 9:
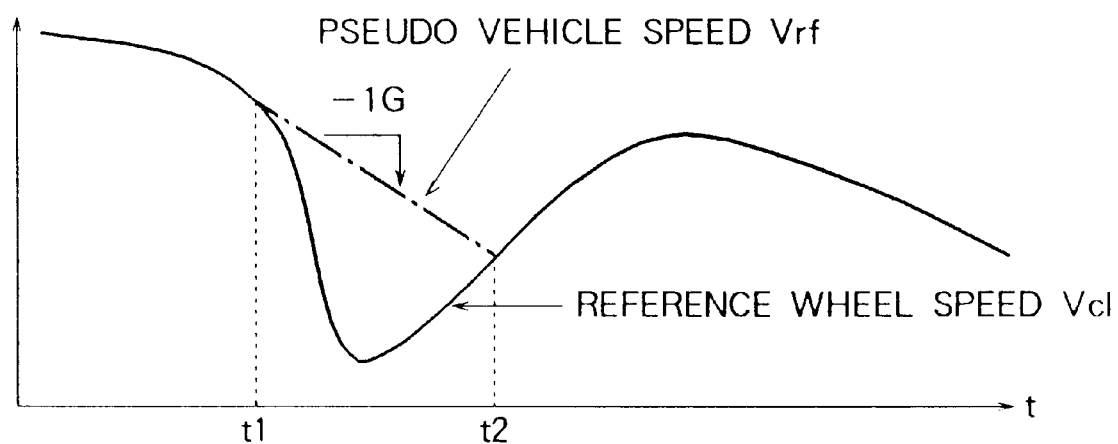
FIG. 9 is a view for illustrating operation for determining arithmetically a pseudo vehicle speed on the basis of a reference wheel speed.

Referring to FIG. 9 which is a view for graphically illustrating relation between the pseudo vehicle speed Vrf and the reference wheel speed Vc1, it can be seen that during a period from a time point t1 to a time point t2, the pseudo vehicle speed Vrf is deviated from the reference wheel speed Vc1, i.e., reference wheel speed Vc1 ≧ pseudo vehicle speed Vrf in the step S20. At the time point t2, the pseudo vehicle speed Vrf matches with the pseudo vehicle speed Vrf. After the time point t2, there is continuously established the state in which no departure is detected between the reference wheel speed Vc1 and the pseudo vehicle speed Vrf.

In the step S21, decision is made as to whether or not the deviation ΔVc1 of the reference wheel speed Vc1 exceeds the gradient or slope (rate) 31 1 G (−1.0 g). If the answer of this decision step S21 is affirmative (Yes), it is then decided that the reference wheel is decelerating, whereupon the processing proceeds to a step S22 with the reference wheel speed Vc1 being regarded that it is deviated from the vehicle speed.

On the other hand, when the deviation ΔVc1 of the reference wheel speed Vc1 does not exceed the value −1 G (−1.0 g), it is regarded that the reference wheel speed Vc1 follows the vehicle speed, whereupon the processing proceeds to a step S23 where the reference wheel speed Vc1 is set as the pseudo vehicle speed Vrf. Again referring to FIG. 9, at the time point t1, decision is made in the step S21 that the reference wheel speed Vc1 starts to deviate or depart from the pseudo vehicle speed Vrf. In succession to the time point t1, the reference wheel speed Vc1 remains in the state deviated from the pseudo vehicle speed Vrf.

Accordingly, in the step S22, it is regarded that the reference wheel speed Vc1 and the pseudo vehicle speed Vrf are deviated from each other. In that case, the reference wheel speed Vc1 can not be utilized for determining the pseudo vehicle speed Vrf. For this reason, the pseudo vehicle speed Vrf is estimated by virtually decelerating the pseudo vehicle speed Vrf determined in the preceding processing routine (i.e., Vrf−1.0 g). Estimation of the pseudo vehicle speed Vrf is validated during the interval or period from t1 to t2 shown in FIG. 9. Practically, there will exist no such road surface which has a friction coefficient greater than 1 G inclusive. Accordingly, the vehicle speed can not decelerate at a higher rate than −1 G inclusive.

For the reason mentioned above, the pseudo vehicle speed Vrf determined in the preceding routine is decelerated at the rate of −1 G at maximum, to thereby estimate the vehicle speed during the period from the time point t1 to t2. In this conjunction, in the case where the output of the acceleration sensor provided for measuring the deceleration of the motor vehicle is inputted to the actuator 10, the output value of the acceleration sensor may be regarded as the maximum value for the deceleration of the motor vehicle, to thereby allow the pseudo vehicle speed Vrf to be decreased at the rate corresponding to the output value of the acceleration sensor.

In the step S23, the pseudo vehicle speed Vrf can be represented by the reference wheel speed Vc1, because the reference wheel speed Vc1 may be regarded as following the vehicle speed. This corresponds to the state succeeding to the time point t2 shown in FIG. 9.

Next, control of the braking hydraulic pressure will be described by reference to a flow chart shown in FIG. 10. In a step S31, when the magnitude of slip S exceeds a predetermined value a and when the wheel acceleration Gw exceeds a predetermined value c, it is then decided that probability of occurrence of wheel locking is high, whereby a pressure-reducing command is issued in a step S33.

By contrast, when it is decided in the step S31 that the magnitude of the slip S is smaller than the predetermined value a inclusive and that the wheel acceleration Gw is smaller than the predetermined value c inclusive thereof, then the processing routine proceeds to a succeeding step S32. When it is decided in the step S32 that the magnitude of the slip S is greater than a predetermined value b and that the wheel acceleration Gw is smaller than a predetermined value d, then decision is made such that the wheel is restored from the tendency of the locking taking place (i.e., probability of occurrence of the wheel locking is low or none). Thus, in a step S34, a command for holding the current braking hydraulic pressure is issued, to wait for the recovery of the wheel speed close to the vehicle speed.

However, unless the restoration is decided in the step S32 and when the slip S is smaller than the predetermined value b with the wheel acceleration Gw being greater than the predetermined value d inclusive, the current processing routine proceeds to a step S35.

In the step S35, the braking hydraulic pressure is increased gently or slowly to thereby enhance correspondingly the braking force. When the braking hydraulic pressure increases continuously, the rotation of the wheel tends to overcome the adhesion of the road surface, to be thereby locked. Accordingly, for the purpose of preventing such tendency, the step S33 is resumed to issue a depressurization command. The cycle of the braking hydraulic pressure reduction command, the braking hydraulic pressure hold command and the braking hydraulic pressure increase command is repetitively executed until the wheels are stopped or until the tendency of locking of the wheels disappears.

By determining the pseudo vehicle speeds for all the four wheels independent of one another, the pseudo vehicle speeds can be determined optimally even when difference in speed takes place between the front and rear wheels, as encountered in the course of turning of the motor vehicle.

Furthermore, even when one of the driving wheels coupled to the engine by way of the differential mechanism 5 floats or rises with the wheel speed increasing steeply beyond the relevant pseudo vehicle speed, the counterpart driving wheel can be protected against increasing beyond the pseudo vehicle speed under the influence of the former.

As will now be understood, according to the teachings of the invention incarnated in the instant embodiment thereof, the pseudo vehicle speed which well matches with the actual vehicle speed is arithmetically determined, whereon magnitude of the slip S is determined on the basis of the pseudo vehicle speed and the wheel speed by executing the processing routine or procedure illustrated in the flow chart of FIG. 7. On the basis of the slip S thus determined, the anti-lock brake control is effectuated in accordance with the procedure illustrated in FIG. 10.

Furthermore, because the wheel speeds of the individual wheels are corrected optimally within a proper range of limitation by taking into account the positional relationship among the individual wheels, there arises no necessity of correcting the pseudo vehicle speed by detecting whether or not the motor vehicle is in the turning state with the aid of a steering angle sensor, to another advantage.

Embodiment 2

In the case of the anti-lock brake control system according to the first embodiment of the invention, the pseudo vehicle speeds are arithmetically determined for the individual wheels on the basis of the reference wheel speeds Vc1, respectively, each of which is limited in respect to the acceleration and the deceleration thereof. However, the pseudo vehicle speed may equally be determined by imposing limitation to the wheel speeds of the individual wheels in respect to acceleration and deceleration and by limiting the pseudo vehicle speeds in dependence on the influential factors of the three other wheels. In that case, the anti-lock brake control generally illustrated in the flow chart of FIG. 6 and described hereinbefore in conjunction with the first embodiment of the invention differs only in the processing step S4 for determining arithmetically the pseudo vehicle speed. Incidentally, the acceleration/deceleration limiting processing and the pseudo vehicle speed determining processing are executed by the controller 11 (FIG. 3) which constitutes the acceleration/deceleration limiting processing means 104a to 104d and the pseudo vehicle speed correcting means 105a to 105d shown in FIG. 2.

According to the invention incarnated in the instant embodiment, the wheel speed is estimated by setting a virtual or pseudo slope for the vehicle speed by limiting acceleration and deceleration of the four wheels and then the estimated wheel speed of one given wheel concerned is limited in accordance with the positional relationship among the three other wheels, to thereby determine arithmetically pseudo vehicle speed for the wheel of concern through the processing in the step S4 shown in FIG. 6. Similarly, the processing in the step S4 is performed for determining the individual pseudo vehicle speeds of the wheels, respectively.

Figure 11:
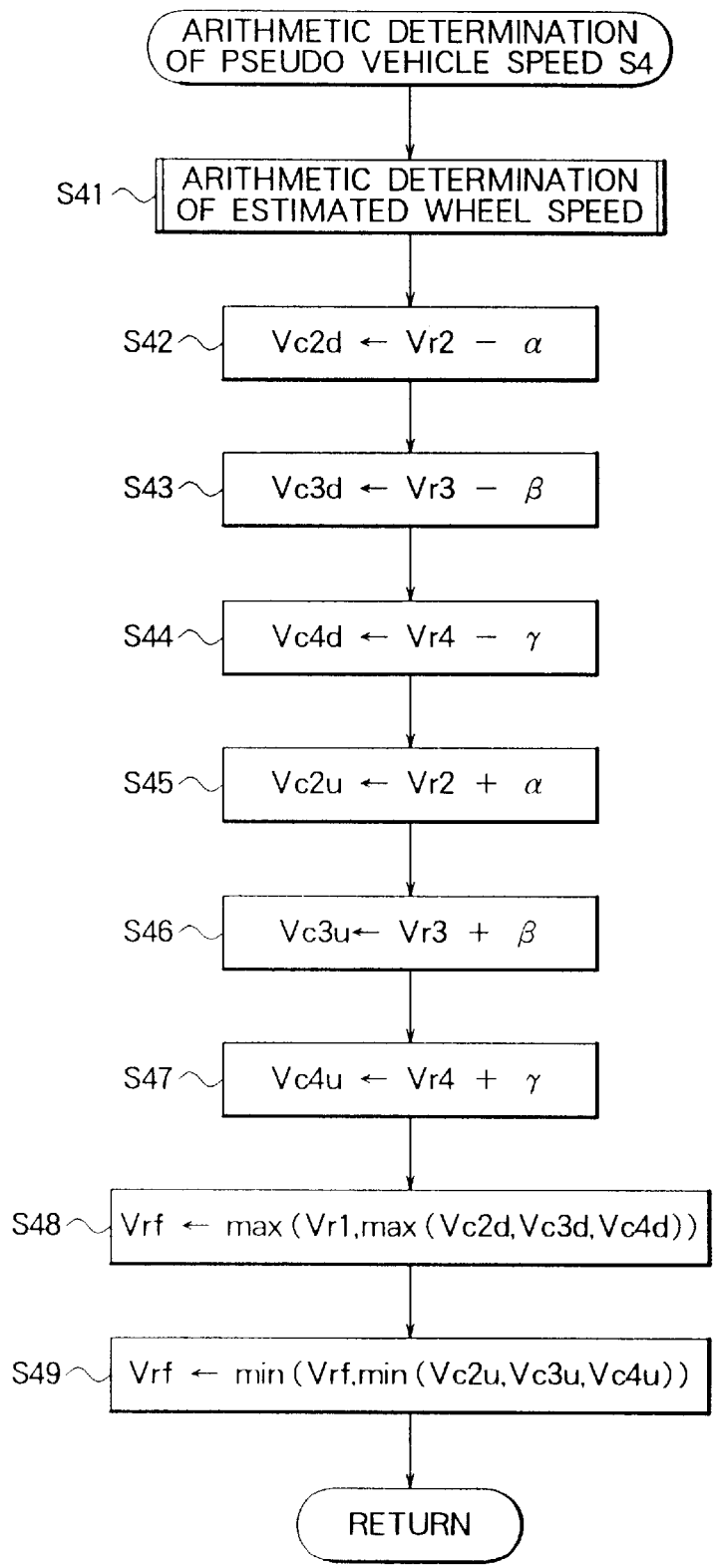
FIG. 11 is a flow chart for illustrating a flow of processings for arithmetically determining a pseudo vehicle speed according to a second embodiment of the invention.
Figure 12:
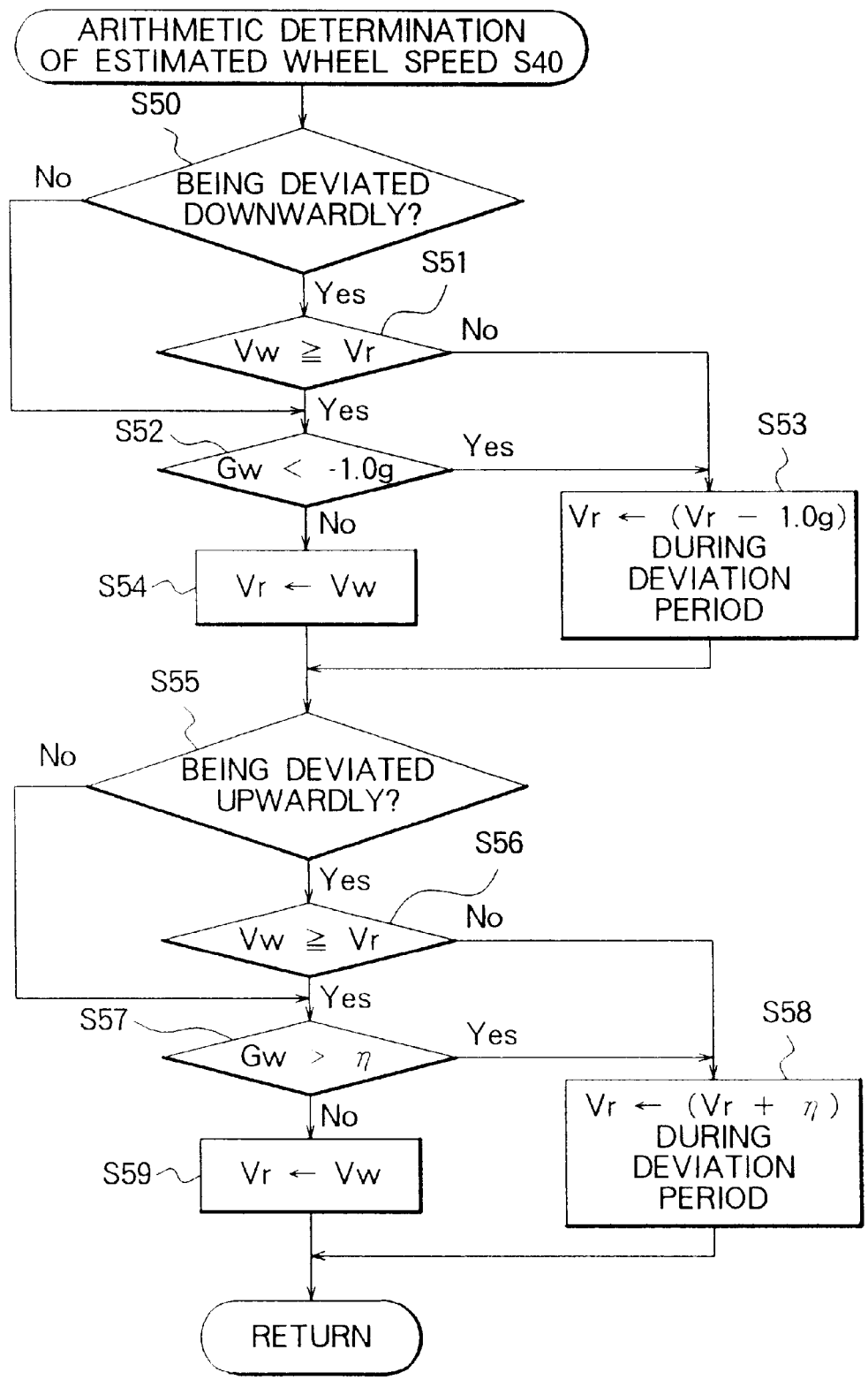
FIG. 12 is a flow chart for illustrating processings for determining estimated wheel speeds according to the second embodiment of the invention.
Figure 13:
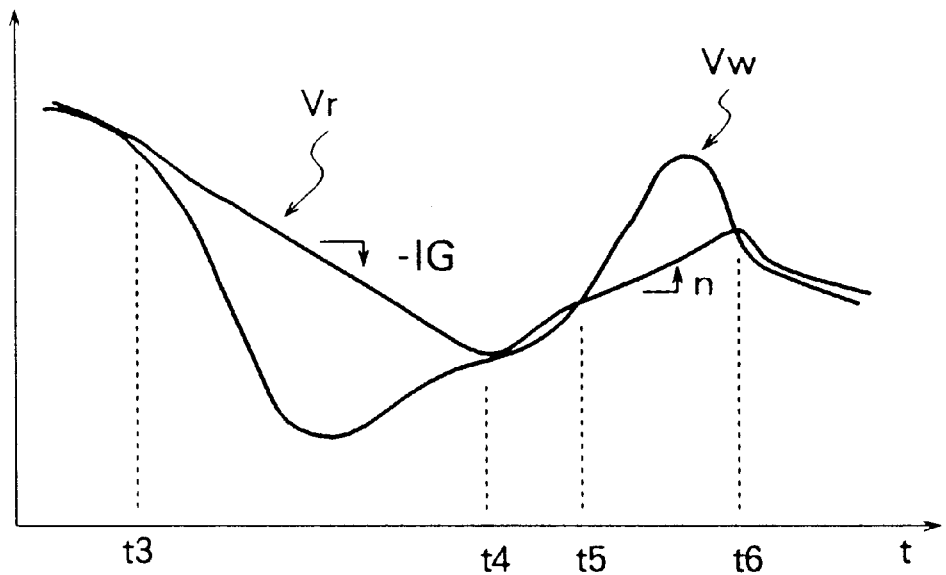
FIG. 13 is a view for illustrating operation of determining arithmetically an estimated wheel speed on the basis of a wheel speed.

The processing in the step S4 for determining the pseudo vehicle speed is illustrated in flow charts of FIGS. 11 and 12. More specifically, FIG. 11 illustrates a processing procedure for setting the slope (gradient) of the virtual or pseudo vehicle speed for each of the wheels. As can be seen in FIG. 13, there may arise such situation in which even when deceleration of the wheel overcomes the road surface friction coefficient, the motor vehicle is not decelerated any further. Accordingly, the wheel speeds of the wheels are estimated, respectively. FIG. 12 is a flow chart illustrating the processings for determining the estimated wheel speeds on the basis of the wheel speeds.

Referring to FIG. 12, in a step S50, decision is made as to whether or not the estimated wheel speed Vr is deviated upwardly from the wheel speed Vw. If so, then the current processing routine proceeds to a step S51, and if otherwise, the processing routine proceeds to a step S52. As can be seen in FIG. 13, the estimated wheel speed Vr deviates upwardly during a period from a time point t3 to a time point t4.

In the step S51, the estimated wheel speed Vr is compared with the wheel speed Vw. In case the estimated wheel speed Vr is lower than the wheel speed Vw inclusive, it is then decided that the state in which the estimated wheel speed Vr is deviated from the wheel speed Vw has ended, whereupon the processing routine proceeds to the step S52. However, when it is decided that the estimated wheel speed Vr is still deviated from the wheel speed Vw, the processing routine proceeds to a step S53. At the time point t4 shown in FIG. 13, it is decided that the deviation between the estimated wheel speed Vr and the wheel speed Vw has come to end. After the time point t4, there exists continuously the state in which no essential departure is detected between the wheel speed Vw and the estimated wheel speed Vr.

In the step S52, decision is made as to whether or not the deviation of the wheel speed Vw exceeds the value −1 G (−1.0 g). If the answer of this decision step S52 is affirmative (Yes), it is then decided that the wheel speed Vw decelerates at the rate which overcomes the coefficient of friction of the road surface, whereupon the processing proceeds to the step S53 by regarding that the wheel speed Vw is deviated from the vehicle speed. On the other hand, when it is decided that the deviation of the wheel speed Vw does not exceed the level or value −1 G (−1.0 g), it is regarded that the wheel speed Vw follows the vehicle speed, whereupon the processing proceeds to a step S54. Referring to FIG. 13, it is at the time point t3 that the wheel speed Vw is decided as being deviated or departed from the estimated wheel speed Vr. From this time point t3 till the time point t4, the wheel speed Vw remains in the state deviated remarkably from the estimated wheel speed Vr.

Accordingly, in the step S53, it is regarded that the wheel speed Vw and the vehicle speed are deviated from each other. In that case, the wheel speed Vw can not be utilized as the estimated wheel speed Vr. For this reason, the estimated wheel speed Vr is determined by virtually decelerating the estimated wheel speed Vr determined in the preceding processing routine to thereby estimate the wheel speed Vw. This estimation of the wheel speed is validated during the interval or period from the time point t3 to t4 shown in FIG. 13. Practically, there exists no such road surface which has a friction coefficient greater than 1 G inclusive. Accordingly, the vehicle speed can not decelerate at a higher rate than −1 G inclusive.

For the reason mentioned above, the vehicle speed is decelerated at the maximum rate of −1 G, to thereby estimate the vehicle speed during this period. In this conjunction, it is to be mentioned that in the case where the output of the acceleration sensor provided for measuring the deceleration of the motor vehicle is inputted to the controller 11, the output value of the acceleration sensor may be regarded as the maximum value for the deceleration of the motor vehicle, to thereby allow the estimated wheel speed Vr to be lowered at the rate corresponding to the output value of the acceleration sensor.

In the step S54, the estimated wheel speed Vr can be represented by the wheel speed Vw, because the wheel speed Vw may be regarded as following the vehicle speed. This corresponds to the state during the period between the time points t4 and t5 shown in FIG. 13.

In a step S55, decision is made as to whether or not the estimated wheel speed Vr is deviated upwardly from the wheel speed Vw. If so, then the processing routine proceeds to a step S56, and if otherwise, the processing proceeds to a step S57. Referring to FIG. 13, the estimated wheel speed Vr is deviated in the downward direction from the wheel speed Vw during the period from a time point t5 to t6.

When it is decided in the step S55 that the estimated wheel speed Vr is deviated from the wheel speed Vw, the estimated wheel speed Vr is compared with the wheel speed Vw in the step S56. If the wheel speed Vw is higher than the estimated wheel speed Vr inclusive, it is then decided that the state in which the estimated wheel speed Vr is deviated from the wheel speed Vw has come to an end, whereupon the processing proceeds to the step S57. On the other hand, when it is decided that the estimated wheel speed Vr has been deviated from the wheel speed Vw yet, the processing routine proceeds to a step S58. Referring to FIG. 13, it is at the time point t6 that the deviation between the estimated wheel speed Vr and the wheel speed Vw is decided as having been terminated in the step S56. After the time point t6, there exists continuously the state in which no deviation is detected between the wheel speed Vw and the estimated wheel speed Vr.

In the step S57, it is decided as to whether or not the deviation of the wheel speed Vw exceeds predetermined value η. If the answer of this decision step S57 is affirmative (Yes), it is then decided that the wheel is accelerated at a high rate overcomes the friction coefficient of the road surface, whereupon the processing routine proceeds to the step S58, regarding that the wheel speed Vw is deviated from the vehicle speed. On the other hand, when the deviation of the wheel speed Vw does not exceed the predetermined value η, it is regarded that the wheel speed Vw follows the vehicle speed. Thus, the processing routine proceeds to a step S59. Referring to FIG. 13, it is at the time point t5 at which the decision is made that the wheel speed Vw is departed from the vehicle speed. After the time point t5, the wheel speed Vw is deviated from the estimated wheel speed Vr.

Accordingly, in the step S58, it is assumed that the wheel speed Vw and the vehicle speed are deviated from each other. Thus, the wheel speed Vw can not be used for determining the estimated wheel speed Vr. Under the circumstances, the estimated wheel speed Vr is determined by virtually accelerating the estimated wheel speed Vr determined in the preceding processing routine.

The above-mentioned phase takes place during a period from the time point t5 to t6. When the braking hydraulic pressure control is being effective, the maximum acceleration can be determined on the basis of the braking force and the repulsion of the road surface. On the other hand, unless the braking hydraulic pressure is controlled, the maximum allowable acceleration inherent to the motor vehicle of concern and known is adopted. Thus, the predetermined value η which is used as the threshold value should preferably be changed in dependence on whether the braking hydraulic pressure control is being effective or not. When the acceleration exceeds the threshold value η, it is decided that the wheel speed exceeds apparently the vehicle speed, incurring a wheel spin phenomenon.

Since it is decided in the SS57 that the wheel speed follows the vehicle speed, the estimated wheel speed Vr can be given by the wheel speed Vw. This phase corresponds to a period from the time point t4 to t5. Through the procedure described above, the wheel suffering the wheel spin can be excluded from the arithmetic operation for determining the estimated wheel speed Vr owing to the limitation of acceleration and deceleration for each of the wheels. Further, for the wheel suffering the spin phenomenon, the acceleration slope or rate can be diminished with the deceleration slope or rate being increased. Thus, it is possible to change the acceleration/deceleration slopes on a wheel basis so that the wheel speed Vw approximates to the vehicle speed.

A given one of the wheels is selected as the reference and the estimated wheel speed thereof is represented by estimated reference wheel speed Vr1. Further, the estimated wheel speed of the wheel located at the left or right side relative to the reference wheel is represented by estimated wheel speed Vr2 while the estimated wheel speed located at the front or rear side relative to the reference wheel is represented by estimated wheel speed Vr3. Additionally, the estimated wheel speed of the wheel located diametrically opposite to the reference wheel is represented by estimated wheel speed Vr4. On the basis of these estimated wheel speeds, pseudo vehicle speed Vrf is determined. The processing steps S42 to S47 shown in the flow chart of FIG. 11 correspond to the processing steps S11 to S16 described hereinbefore in conjunction with the first embodiment of the invention. In other words, in these processing steps, estimated wheel speeds Vr of the wheel speed are corrected in consideration of the positions thereof, respectively.

In this conjunction, by determining the correcting quantities α,β and γ while taking into consideration the performance characteristics of the motor vehicle in the turning operation as in the case of the first embodiment of the invention, there are made available the correcting quantities for the individual wheels which conform with the maneuverability of the motor vehicle.

In the step S48, processing for setting the lower limit value for the estimated wheel speed Vr of the reference wheel is executed. More specifically, in determination of the pseudo vehicle speed Vrf, a smallest value of the maximum speeds of the three other wheels which have been corrected with the respective lower limit correcting quantities is selected as the lower limit value to be set for the estimated wheel speed Vr so that the estimated wheel speed Vr does not become lower than the lower limit value.

By setting the lower limit value as mentioned above, it is possible to prevent the pseudo vehicle speed Vrf from lowering below the actual vehicle speed. Furthermore, because the lower limit speed is determined in consideration of the correction for the turning state of the motor vehicle, the pseudo vehicle speed Vrf can be lowered to the correcting quantity for the wheel located at the outer side relative to the reference wheel as viewed in the turning direction of the motor vehicle. On the other hand, when the outer wheel is selected as the reference wheels the pseudo vehicle speed Vrf can be lowered by following the wheel speed of the associated wheel nevertheless of occurrence of speed difference between the front wheel and the rear wheel. Thus, the pseudo vehicle speed Vrf can be prevented from increasing beyond the vehicle speed under the influence of the other wheels.

In the step S49, processing for setting the upper limit for the pseudo vehicle speed Vrf is effected. To this end, the greatest value of the maximum speeds of the three other wheels which have been corrected with the respective correcting quantities is selected as the upper limit value so that the pseudo vehicle speed Vrf does not exceed the upper limit value.

By setting the upper limit value as mentioned above, it is possible to prevent the wheel speed from increasing steeply beyond the actual vehicle speed even when the driving wheel located at the side opposite to the counterpart selected as the reference wheel and coupled to the former through the differential mechanism tends to sink.

As is apparent from the foregoing, by setting the lower limit and the upper limit for the speed of the reference wheel in consideration of the positional relationship among the three other wheels, it is possible to prevent the pseudo vehicle speed Vrf for the reference wheel from increasing or decreasing excessively, whereby the optimal pseudo vehicle speed Vrf can be determined.

Embodiment 3

In the case of the anti-lock brake control system according to the second embodiment of the invention, correction of the pseudo vehicle speed has been described without discriminating the motor vehicle with regards to whether it is driven by two driving wheels (two-wheel-drive motor vehicle) or by four driving wheels (four-wheel-drive motor vehicle). Needless to say, in the two-wheel-drive motor vehicle, there exist non-driving wheels which are not coupled to the engine. In that case, the non-driving wheel can evade from the steep increase of the wheel speed Vw beyond the vehicle speed and wheel spin phenomenon because of no intervention of the differential mechanism 5. Accordingly, the non-driving wheel can positively be utilized in the anti-lock brake control, wherein the wheel speed Vw of the driving wheel is passively limited while that of the non-driving wheel is positively limited.

Figure 14:
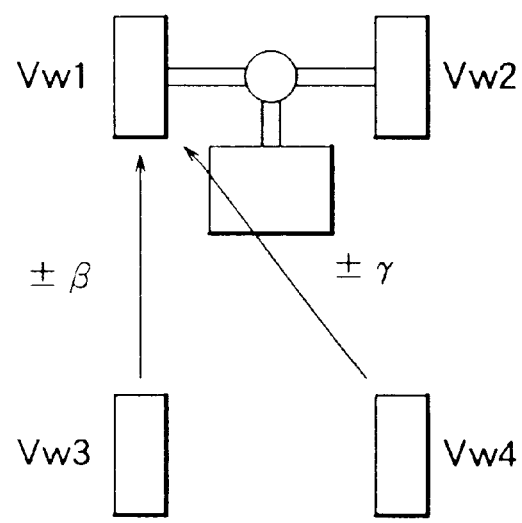
FIG. 14 is a view for illustrating a positional relation among wheels of a motor vehicle which is taken into account in an anti-lock brake control in which limited correction is performed for driving wheels according to a third embodiment of the present invention.
Figure 15:
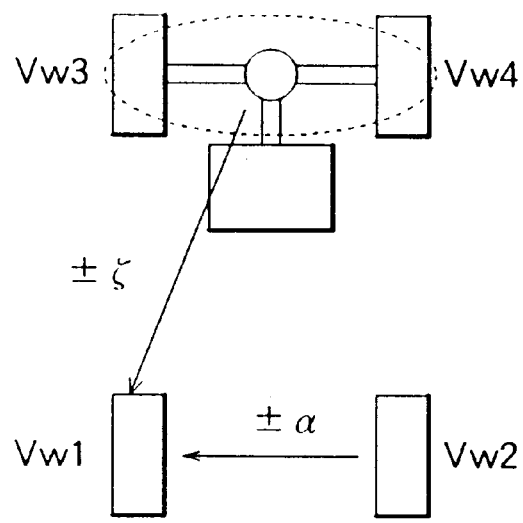
FIG. 15 is a view for illustrating a positional relation among wheels of a motor vehicle which is taken into consideration in an anti-lock brake control in which limited correction is performed for non-driving wheels according to another embodiment of the present invention.

FIG. 14 is a view showing wheels whose speeds Vw are limited in determination of the pseudo vehicle speed of the driving wheel of a two-wheel-drive motor vehicle. FIG. 15 is a view showing wheels whose speeds Vw are limited in determination of the reference wheel speeds Vc1 for the non-driving wheels in the two-wheel-drive motor vehicle.

Figure 16:
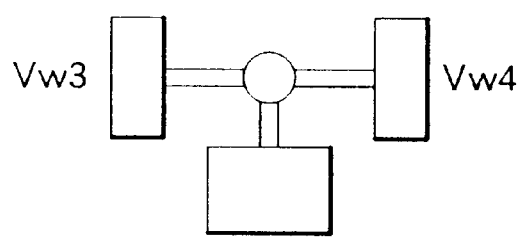
FIG. 16 is a view for illustrating a positional relation among wheels of a motor vehicle which is taken into consideration in an anti-lock brake control in which limited correction is performed in a non-controlled state according to yet another embodiment of the present invention.
Figure 16:
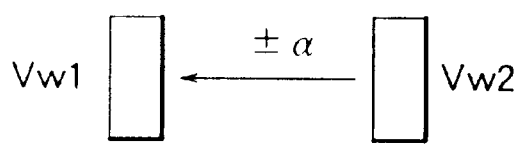
Figure 17:
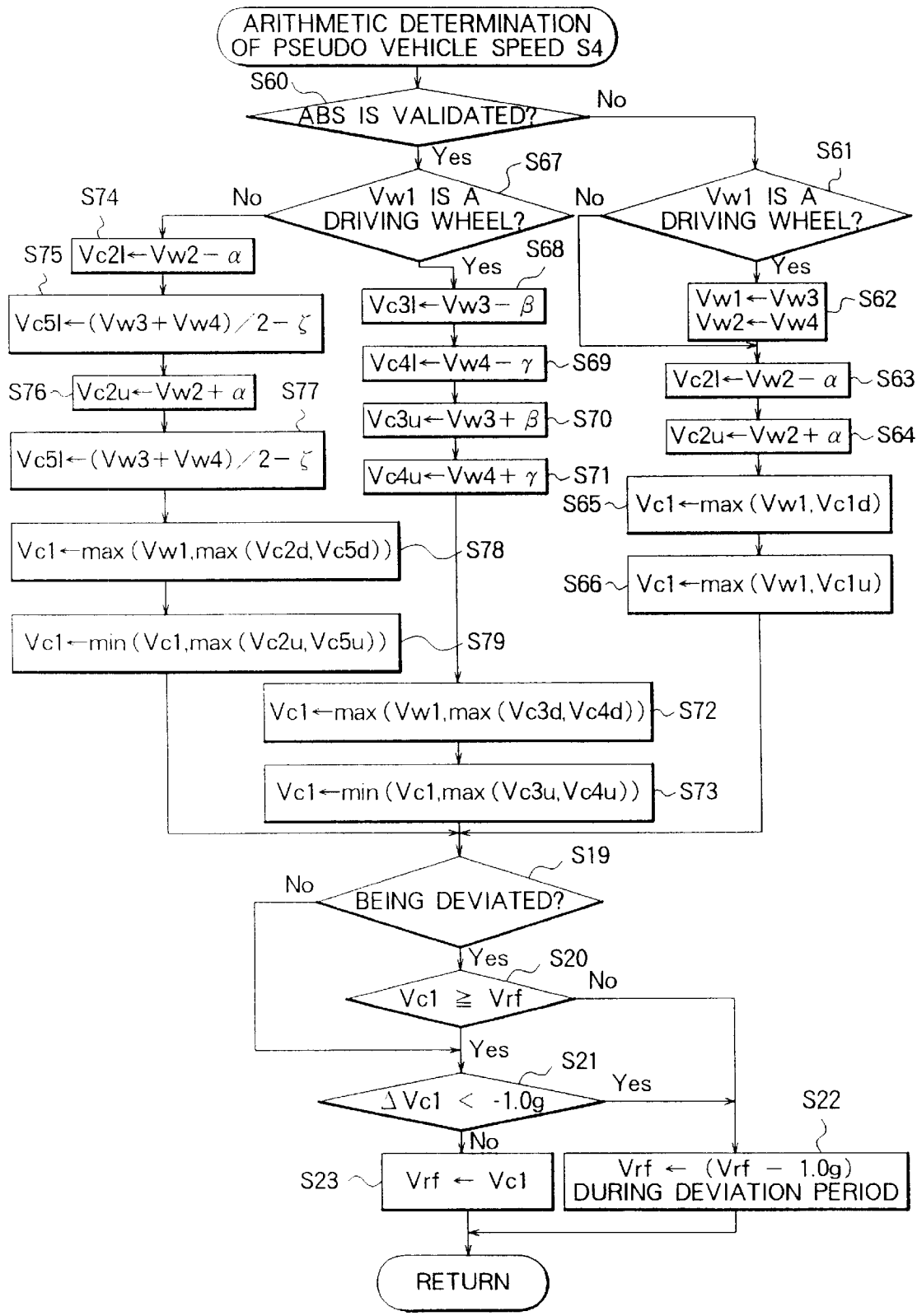
FIG. 17 is a flow chart for illustrating processings for determining estimated wheel speeds according to an embodiment of the invention.
Figure 18:
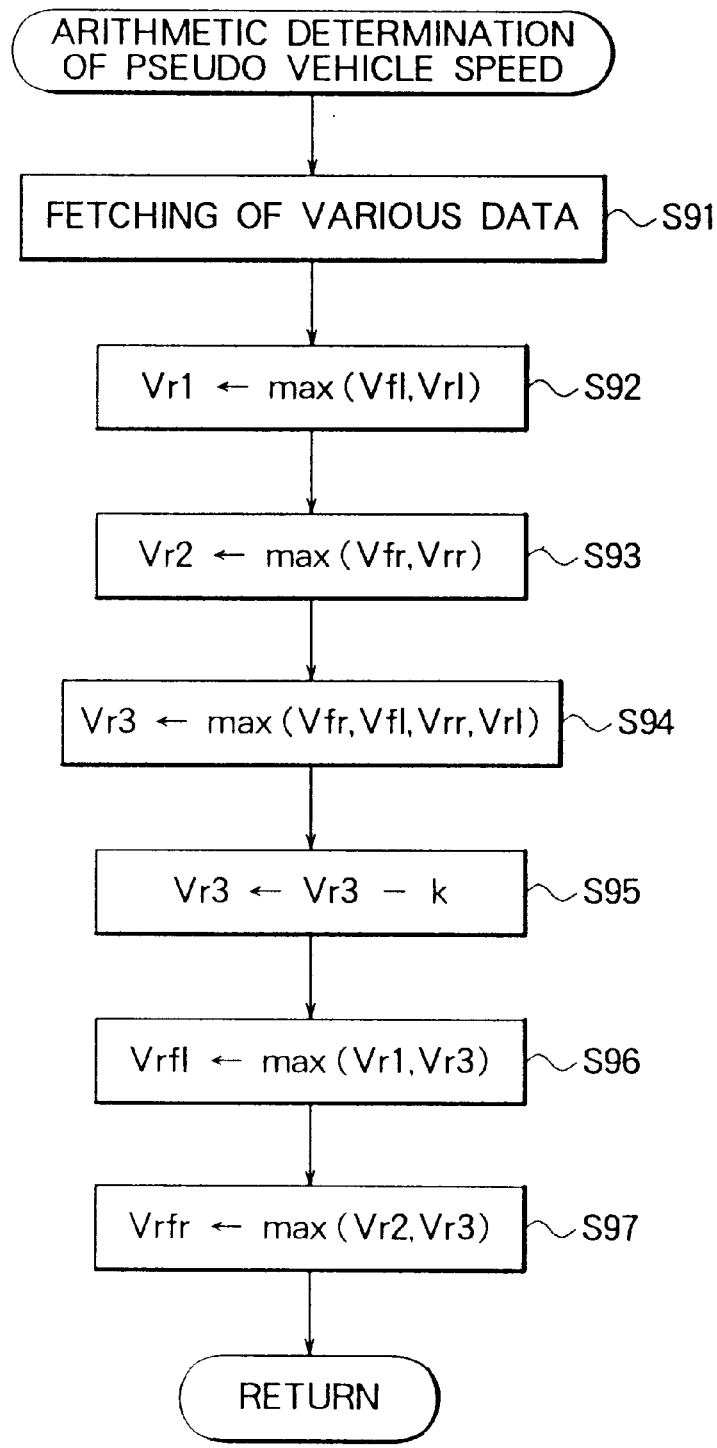
FIG. 18 is a flow chart for illustrating a flow of processing for arithmetically determining a pseudo vehicle speed in an anti-lock brake control system known heretofore.

Furthermore, FIG. 16 is a view for illustrating a control method according to which the reference wheel speed Vc1 is arithmetically determined only for two non-driving wheels without limiting the wheel speed Vw of the driving wheels when the anti-lock brake control is not validated in a two-wheel-drive motor vehicle. In the following, methods of determining the reference wheel speed Vc1 in the cases assumed above will be described by referring to a flow chart of FIG. 17.

Referring to the figure, it is decided in a step S60 whether or not the anti-lock brake control is being validated, i.e., whether the braking hydraulic pressure is being regulated. If so, the processing routine proceeds to a step S67, and if otherwise, a processing step S61 is executed. In other words, in the step S60, it is decided whether there is a tendency for occurrence of wheel lock. Such tendency is expected to occur when the anti-lock brake control is being effective. In that case, the wheel speed Vw may decrease more steeply than the vehicle speed or the wheel speed Vw once decreased may increase rapidly to the vicinity of the vehicle speed.

To say in another way, when the wheel lock is likely to occur, there arises necessity of estimating the vehicle speed on the basis of as many wheel speeds as possible because of possibility of sinking of speed in at least one wheel. By contrast, when the anti-lock brake control is not validated, it is sufficient to determine the reference wheel speed Vc1 by limiting the wheel speed Vw only for the non-driving wheels.

In a step S61, decision is made as to whether the wheel speed Vw of the driving wheel or that of the non-driving wheel is to be limited for arithmetically determining the reference wheel speed Vc1. When it is the non-driving wheel, the processing routine proceeds to a step S63. On the other hand, when it is decided that the wheel speed of the driving wheel is to be limited, then the wheel speed Vw3 is substituted for by the reference wheel speed Vw1 while the wheel speed Vw4 is substituted for by the wheel speed Vw2. Thus, when the anti-lock brake control is not validated, the reference wheel speed Vc1 is not determined on the basis of the wheel speed Vw of the driving wheel. Thus, the reference wheel speed Vc1 can be prevented from increasing beyond the actual vehicle speeds due to the wheel spin phenomenon or the like.

In steps S63 and S64, the wheel speed Vw of the left and right non-driving wheels undergo the processings for subtraction of a correcting quantities and addition of a correcting quantity, respectively. In the case of the anti-lock brake control system according to the first and second embodiments of the invention, the wheel speeds Vw of the wheels located at the front or rear side of the reference wheel and the wheel located diametrically opposite to the reference wheel. By contrast, in the case of the anti-lock brake control system according to the instant embodiment where the wheel speeds of the driving wheels are excluded, only the left and right wheels are subject to the correction of the wheel speed.

In steps S65 and S66, the reference wheel speed Vc1 of the wheel concerned is imposed with upper and lower limits in dependence on the positional relation of the wheel located at the left or right side relative to the wheel concerned through the similar procedure as described hereinbefore in conjunction with the first and second embodiments. However, because the wheel speeds of the front or rear wheel as well as that of the wheel located diametrically opposite to the reference wheel is not subjected to any limitation, the reference wheel speed Vc1 can positively be prevented from increasing beyond the actual vehicle speed due to wheel spin or hopping of the wheel.

In a step S67, it is decided whether or not the wheel concerned is a driving wheel. If so, the processing proceeds to a step S68 while if otherwise, a processing step S76 is executed. In other words, when the wheel of concern is a driving wheel, then limitation illustrated in FIG. 14 is validated. On the other hand, when the wheel concerned is a non-driving wheel, limitation illustrated in FIG. 15 is applied.

In steps S68 to S73, correction processing is conducted on the wheel speed Vw for the wheel located diametrically opposite to the wheel concerned for thereby limiting the wheel speed of the wheel concerned, as in the case of the first and second embodiments of the invention. However, no limitation is imposed onto the wheel speeds of the wheel located at the left or right side and the other driving wheel, as shown in FIG. 14. Thus, such situation can be avoided in which the wheel speed of the wheel concerned decreases steeply with the wheel speed of the other driving wheel increasing beyond the vehicle speed to thereby increase the reference wheel speed Vc1 during the control.

In steps S74 and S75, correction is performed for the wheel speed Vw of the left and right non-driving wheels, as described hereinbefore in conjunction with the anti-lock brake control according to the first and second embodiments. Further, in steps S76 and S77, a mean value of wheel speed Vw of the two driving wheels located at the front or rear side of the reference wheel and located diametrically opposite to the latter is determined as illustrated in FIG. 15.

Owing to the mean value correcting processing mentioned above, such situation can be suppressed in which the rotation speed of one of the driving wheels decreases steeply with the wheel speed of the other driving wheel increasing beyond the vehicle speed to thereby force the reference wheel speed Vc1 to increase. Further, the mean value correcting processing is advantageous in that the vehicle speed can be determined with higher accuracy because the speed limitation is imposed on both the non-driving wheels instead of one non-driving wheel.

In the steps S78 and S79, the reference wheel speed is arithmetically determined by imposing the upper and lower limits to the wheel speed Vw of the non-driving wheel concerned on the basis of the speed resulting from the correction of the mean speed values of the wheel located opposite to the non-driving wheel and the driving wheel, respectively, as in the case of the first and second embodiments.

In steps S19 to S23, the wheel speed Vw is limited with regard to acceleration/deceleration to thereby set a speed increasing/decreasing slope or rate for calculating the reference wheel speed Vc1.

Many modifications and variations of the present invention are possible in the light of the above techniques. It is therefore to be understood that within the scope of the appended claims, the invention may be practiced otherwise than as specifically described.

What is claimed is:

1. An anti-lock brake control system for a motor vehicle, comprising:

wheel speed detecting means for detecting wheel speeds of individual wheels, respectively, of a motor vehicle;

reference wheel speed arithmetic means for arithmetically determining corrected wheel speeds by correcting the wheel speeds of other wheels than one wheel selected as a reference wheel with correcting quantities determined in accordance with positional relations between said reference wheel and said other wheels to impose an upper limit and a lower limit for the wheel speed of said reference wheel in accordance with said corrected speeds for thereby arithmetically determining a reference wheel speed; and pseudo vehicle speed arithmetic means for arithmetically determining a pseudo vehicle speed on the basis of said reference wheel speed determined by said reference wheel speed arithmetic means, wherein braking hydraulic pressures for brake application to said wheels are controlled in accordance with results of comparison between said pseudo vehicle speed and said wheel speeds.

2. An anti-lock brake control system for a motor vehicle according to claim 1, wherein a smallest value is selected from maximum wheel speeds of said other wheels, that have undergone lower limit corrections, and said smallest value is set as a lower limit value, and wherein said reference wheel speed is set higher than said lower limit value inclusive thereof.

3. An anti-lock brake control system for a motor vehicle according to claim 1, wherein a greatest value is selected from maximum wheel speeds of said other wheels, that have undergone upper limit corrections, and said greatest value is set as an upper limit value, and wherein said reference wheel speed is set lower than said upper limit value inclusive thereof.

4. An anti-lock brake control system for a motor vehicle according to claim 1, said motor vehicle being of a two-wheel-drive type having two driving wheels and two non-driving wheels, wherein when said pseudo vehicle speed for one of said driving wheels is to be arithmetically determined during anti-lock brake control, the wheel speeds of said non-driving wheels are corrected with correcting quantities determined in accordance with positional relations between said one driving wheel and said two non-driving wheels, respectively, to thereby determine arithmetically corrected speeds, respectively, wherein said reference wheel speed is determined by imposing an upper limit and a lower limit to the wheel speed of said one driving wheel with said corrected speeds, respectively, and wherein said pseudo vehicle speed is arithmetically determined on the basis of said reference wheel speed.

5. An anti-lock brake control system for a motor vehicle according to claim 1, said motor vehicle being of a two-wheel-drive type having two driving wheels and two non-driving wheels, wherein when said pseudo vehicle speed for one of said non-driving wheels is to be arithmetically determined during anti-lock brake control, a reference wheel speed is determined by setting an upper limit and a lower limit for the wheel speed of said one non-driving with corrected speed of said one non-driving wheel as determined on the basis of correcting quantities which in turn are determined in accordance with positional relations of said non-driving wheels, respectively, and a mean value of the wheel speeds of said two driving wheels, to thereby determine arithmetically said pseudo vehicle speed on the basis of said reference wheel speed.

6. An anti-lock brake control system for a motor vehicle according to claim 1, said motor vehicle being of a two-wheel-drive type having two driving wheels and two non-driving wheels, wherein during a period in which anti-lock brake control is not effectuated, reference wheel speeds are determined for said non-driving wheels, respectively, by setting an upper limit and a lower limit for corrected speeds of said non-driving wheels, respectively, as determined on the basis of correcting quantities which in turn are determined in accordance with positions of said non-driving wheels, respectively, to thereby determine arithmetically said pseudo vehicle speed on the basis of said reference wheel speed.

* * * * *